(12) United States Patent
Bowron

(10) Patent No.: US 12,037,781 B2
(45) Date of Patent: *Jul. 16, 2024

(54) MODULAR BUILDING CONNECTOR

(71) Applicant: Z-MODULAR HOLDING, INC., Chicago, IL (US)

(72) Inventor: Julian Bowron, Toronto (CA)

(73) Assignee: Z-MODULAR HOLDING, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,954

(22) Filed: Feb. 25, 2022

(65) Prior Publication Data

US 2022/0186487 A1   Jun. 16, 2022

Related U.S. Application Data

(63) Continuation of application No. 16/941,816, filed on Jul. 29, 2020, now Pat. No. 11,479,962, and a
(Continued)

(51) Int. Cl.
*E04B 1/343* (2006.01)
*E04B 1/24* (2006.01)
*E04B 1/348* (2006.01)

(52) U.S. Cl.
CPC ........ *E04B 1/34326* (2013.01); *E04B 1/2403* (2013.01); *E04B 1/3483* (2013.01);
(Continued)

(58) Field of Classification Search
CPC .. E04B 1/34326; E04B 1/2403; E04B 1/3483; E04B 2001/2406;
(Continued)

(56) References Cited

U.S. PATENT DOCUMENTS 946,423 A   1/1910   Connaty
2,037,736 A   4/1936   Payne et al.
(Continued)

FOREIGN PATENT DOCUMENTS

AU   2014221181 B2   8/2014
AU   2018204197 A1   7/2018
(Continued)

OTHER PUBLICATIONS

European Search Report dated Jul. 8, 2022, for European Application No. 22165259.7 (12 pages).
(Continued)

*Primary Examiner* — Gisele D Ford
(74) *Attorney, Agent, or Firm* — Fitch, Even, Tabin & Flannery, LLP

(57) ABSTRACT

A connector assembly, having an upper connector coupled to a lower connector and a gusset plate sandwiched between the upper and lower connectors. The upper and lower connectors allow for coupling to adjacent upper and lower connectors, respectively, allowing for addition of a modular unit to a pre-existing modular structure. Also, ways of coupling adjacent upper connectors and coupling of adjacent lower connectors when coupling a modular unit to a pre-existing modular structure are provided.

12 Claims, 20 Drawing Sheets

Related U.S. Application Data continuation of application No. 16/479,034, filed as application No. PCT/CA2018/050065 on Jan. 19, 2018, now Pat. No. 10,870,980.

(60) Provisional application No. 62/448,123, filed on Jan. 19, 2017.

(52) U.S. Cl.
CPC .............. *E04B 2001/2406* (2013.01); *E04B 2001/2415* (2013.01); *E04B 2001/2451* (2013.01); *E04B 2001/2484* (2013.01); *E04B 2001/2496* (2013.01)

(58) Field of Classification Search
CPC ..... E04B 2001/2415; E04B 2001/2451; E04B 2001/2484; E04B 2001/2496
See application file for complete search history.

(56) References Cited

U.S. PATENT DOCUMENTS

| | | |
|---|---|---|
| 3,205,611 A | 9/1965 | Onanian |
| 3,416,210 A | 12/1968 | McHugh |
| 3,824,750 A | 7/1974 | Antoniou |
| 3,858,989 A | 1/1975 | Field |
| 3,973,855 A | 8/1976 | Florence |
| 4,003,144 A | 1/1977 | Maddestra et al. |
| D248,447 S | 7/1978 | Hornung |
| D258,194 S | 2/1981 | Stanley |
| 4,620,404 A | 11/1986 | Rizk |
| 4,726,701 A | 2/1988 | Thomas |
| 4,758,111 A | 7/1988 | Vitta |
| 4,925,330 A | 5/1990 | Cornish |
| 5,066,161 A | 11/1991 | Pinney |
| 5,127,759 A | 7/1992 | Orbom |
| 5,259,685 A | 10/1993 | Wolf |
| D357,544 S | 4/1995 | Spransy |
| 5,414,918 A | 5/1995 | Pearson |
| 5,440,544 A | 8/1995 | Zinser, Jr. |
| 5,451,115 A | 9/1995 | Sayres |
| 5,516,225 A | 5/1996 | Kvols |
| 5,556,218 A | 9/1996 | Homer |
| 5,590,974 A | 1/1997 | Yang |
| 5,605,410 A | 2/1997 | Pantev |
| 5,727,358 A | 3/1998 | Hayashi et al. |
| 5,816,011 A | 10/1998 | Kuramoto |
| 5,820,289 A | 10/1998 | Kern et al. |
| 5,904,437 A | 5/1999 | Allen |
| 5,921,049 A | 7/1999 | Sugiyama |
| 6,062,761 A | 5/2000 | Allen |
| 6,092,849 A | 7/2000 | Zambelli et al. |
| 6,247,869 B1 | 6/2001 | Lichvar |
| 6,332,657 B1 | 12/2001 | Fischer |
| 6,334,286 B1 | 1/2002 | Zambelli et al. |
| 6,390,719 B1 | 5/2002 | Chan |
| 6,974,276 B2 | 12/2005 | Kirchner et al. |
| 7,503,623 B2 | 3/2009 | Favaretto |
| D622,865 S | 8/2010 | Bajrami |
| 7,882,388 B2 | 2/2011 | Bramante |
| 7,883,288 B2 | 2/2011 | Joma |
| 7,941,985 B2 | 5/2011 | Simmons |
| 8,176,703 B2 | 5/2012 | Tremacchi |
| 9,121,433 B1 | 9/2015 | Bacon |
| D756,202 S | 5/2016 | Leduc |
| 9,334,642 B1 | 5/2016 | Tanaka et al. |
| 9,458,619 B2 | 10/2016 | Bowron et al. |
| 9,845,595 B2 | 12/2017 | Bowron |
| 9,932,734 B1 | 4/2018 | Winter |
| 127,967 A1 | 5/2018 | Bowron |
| 10,036,156 B1 | 7/2018 | Macdonald et al. |
| 10,450,737 B2 | 10/2019 | Bowron |
| D867,108 S | 11/2019 | Bowron |
| 2002/0007614 A1 | 1/2002 | Katayama et al. |
| 2005/0034390 A1 | 2/2005 | Dubensky et al. |
| 2006/0112657 A1 | 6/2006 | Abbott-Wilcox |
| 2009/0087255 A1 | 4/2009 | Joma |
| 2009/0307994 A1 | 12/2009 | Cathcart et al. |
| 2011/0219708 A1 | 9/2011 | Ohnishi et al. |
| 2011/0286121 A1 | 11/2011 | Werner et al. |
| 2011/0308063 A1 | 12/2011 | Feeleus |
| 2013/0045042 A1 | 2/2013 | Ohlson |
| 2013/0306808 A1 | 11/2013 | Huang |
| 2014/0286695 A1 | 9/2014 | Jocham et al. |
| 2014/0294500 A1 | 10/2014 | Schaff et al. |
| 2015/0184369 A1 | 7/2015 | Carless |
| 2016/0002909 A1 | 1/2016 | Bowron |
| 2017/0002559 A1 | 1/2017 | Bowron et al. |
| 2017/0044753 A1 | 2/2017 | Bowron |
| 2018/0127967 A1 | 5/2018 | Bowron |
| 2018/0135295 A1 | 5/2018 | Bowron |
| 2018/0216336 A1 | 8/2018 | Macdonald et al. |
| 2019/0078321 A1 | 3/2019 | Bowron |
| 2019/0136504 A1 | 5/2019 | Burgess |

FOREIGN PATENT DOCUMENTS

| | | |
|---|---|---|
| CA | 2744074 A1 | 12/2011 |
| CN | 1149651 A | 5/1997 |
| CN | 2381689 Y | 6/2000 |
| CN | 101575876 A | 11/2009 |
| CN | 101680227 A | 3/2010 |
| CN | 101769008 A | 7/2010 |
| CN | 202559534 U | 11/2012 |
| CN | 202672346 U | 1/2013 |
| CN | 203834666 U | 9/2014 |
| CN | 104612250 A | 5/2015 |
| DE | 249688 A1 | 9/1987 |
| DE | 19517785 A1 | 11/1996 |
| DE | 59704916 T2 | 11/2001 |
| EP | 0761895 A1 | 6/1996 |
| EP | 0761895 A1 | 3/1997 |
| EP | 1683923 A2 | 7/2006 |
| EP | 2759648 A1 | 7/2014 |
| EP | 2818429 A1 | 12/2014 |
| EP | 2959067 A4 | 12/2015 |
| GB | 2300432 A | 11/1996 |
| GB | 2554967 A | 4/2018 |
| JP | S52-094009 U | 7/1977 |
| JP | S62-031604 U | 2/1987 |
| JP | S63-179306 U | 11/1988 |
| JP | H03-066303 U | 6/1991 |
| JP | H03-224926 A | 10/1991 |
| JP | H03233042 A | 10/1991 |
| JP | H03267431 A | 11/1991 |
| JP | H04-098904 U | 8/1992 |
| JP | H04261733 A | 9/1992 |
| JP | H05195584 A | 8/1993 |
| JP | H0642060 A | 2/1994 |
| JP | 3014203 U | 5/1995 |
| JP | H07180221 A | 7/1995 |
| JP | H07180228 A | 7/1995 |
| JP | 3014203 U | 8/1995 |
| JP | H07243239 A | 9/1995 |
| JP | H07300901 A | 11/1995 |
| JP | H09194179 A | 7/1997 |
| JP | H09-278352 A | 10/1997 |
| JP | H09278352 A | 10/1997 |
| JP | H0967869 | 11/1997 |
| JP | H10245929 A | 9/1998 |
| JP | H10331267 A | 12/1998 |
| JP | 2001214530 A | 8/2001 |
| JP | 2002081140 A | 3/2002 |
| JP | 2003293458 A | 10/2003 |
| JP | 2004270438 A | 9/2004 |
| JP | 2005139623 A | 6/2005 |
| JP | 2006063787 A | 3/2006 |
| JP | 2009024419 A | 2/2009 |
| JP | 2010112008 A | 5/2010 |
| JP | 2010168889 A | 8/2010 |
| JP | 2013245501 A | 12/2013 |
| JP | 2013245501 A1 | 12/2013 |
| JP | 2016513192 A | 5/2016 |
| JP | 2017515027 A | 6/2017 |

(56) References Cited

FOREIGN PATENT DOCUMENTS

| | | | |
|---|---|---|---|
| JP | 2018529913 A | 10/2018 | |
| KR | 100923637 B1 | 10/2009 | |
| KR | 20110053101 A | 5/2011 | |
| KR | 10-1233559 B1 | 2/2013 | |
| KR | 101676411 B1 | 11/2016 | |
| KR | 20160148659 A | 12/2016 | |
| TW | 294752 B | 1/1997 | |
| WO | 98/36134 A1 | 8/1998 | |
| WO | 9836134 A1 | 8/1998 | |
| WO | 03069083 A1 | 8/2003 | |
| WO | 2004035952 A1 | 4/2004 | |
| WO | 2006096997 A1 | 9/2006 | |
| WO | 2006122372 A1 | 11/2006 | |
| WO | 2007144913 A1 | 12/2007 | |
| WO | 2010035816 A | 4/2010 | |
| WO | 2012083391 A1 | 6/2012 | |
| WO | 2012129601 A1 | 10/2012 | |
| WO | 2014127472 A1 | 8/2014 | |
| WO | 2015/164975 A1 | 11/2015 | |
| WO | 2015164975 A1 | 11/2015 | |
| WO | WO-2015164975 A1 * | 11/2015 | ........... E04B 1/1903 |
| WO | 2016165022 A1 | 10/2016 | |
| WO | 2017027965 A1 | 2/2017 | |
| WO | 2018132921 A1 | 7/2018 | |

OTHER PUBLICATIONS

Office Action issued against corresponding Brazilian Patent Application No. BR112015020099 dated Jun. 2, 2020 in Portuguese (4 pages).
Office Action issued against corresponding Brazilian Patent Application No. BR112018002870-3 dated Aug. 5, 2020 in Portuguese (4 pages).
Office Action issued against corresponding Chinese Patent Application No. 2016800526457 dated Jun. 9, 2020 in Chinese and English (8 pages).
Office Action issued against corresponding Japanese Patent Application No. 2018-526978 dated Aug. 21, 2020 in Japanese and English (14 pages).
First Examination Report issued against corresponding Australian Patent Application No. 2016247454 dated May 20, 2020 in English (8 pages).
Second Examination Report issued against corresponding Australian Patent Application No. 2016247454 dated Jun. 23, 2020 in English (9 pages).
Office Action issued against corresponding Indonesian Patent Application No. P00201904813 dated Sep. 14, 2020; English translation submitted herewith (4 pages).
IPOS Written Opinion issued against corresponding Singaporean Patent Application No. 11201906602S dated Sep. 4, 2020 in English (7 pages).
Office Action issued against corresponding Chinese Patent Application No. 201880013277.4 dated Oct. 27, 2020 in Chinese (13 pages).
Office Action issued against corresponding Japanese Patent Application No. 2018-50557 dated Nov. 17, 2020 with English translation (6 pages).
Office Action issued against corresponding Indian Patent Application No. 201817005845 dated Sep. 14, 2020 with English translation (6 pages).
Certificate of Grant issued by IPOS for Singaporean Patent Application No. 11201801190R dated Oct. 14, 2020, in English (3 pages).
Search Report issued against corresponding Brazilian Patent Application No. BR112016025375-2 dated Jul. 12, 2020, with English machine translation (11 pages).
Search Report issued against corresponding Chinese Patent Application No. 2019104842745 dated Oct. 27, 2020, with English translation (11 pages).
Communication under Rule 71(3) EPC issued for corresponding European Patent Application No. 15 785 510.7 dated Aug. 3, 2020 in English (6 pages).

Office Action issued against corresponding Indonesian Patent Application No. P00201607453 dated Apr. 30, 2020, with English machine translation (4 pages).
Office Action issued against corresponding Indonesian Patent Application No. P00201607453 dated Aug. 24, 2020, with English machine translation (4 pages).
Office Action issued against corresponding Japanese Patent Application No. 2017-508717 dated Nov. 24, 2020 with English machine translation (9 pages).
Office Action issued against corresponding Mexican Patent Application No. MX/a/2016/01427 4 dated Aug. 26, 2020, with English machine translation (6 pages).
Certificate of Grant issued for corresponding Australian Patent Application No. 2018204197 dated Nov. 12, 2020 in English (1 page).
Office Action issued against corresponding Indian Patent Application No. 8541/DELNP/2015 dated Nov. 18, 2020 with English translation (6 pages).
Certificate of Patent issued for corresponding Japanese Patent Application No. 2018-218118 with English translation.
Notice of English Allowance translation issued for corresponding Mexican Patent Application No. MX/a/2015/010800 dated Jul. 27, 2020 with English translation (2 pages).
Notice of with Allowance for South Korean Patent Application No. 10-2015-7026049 dated Nov. 20, 2020 with English translation (7 pages).
Office Action issued against corresponding Chinese Patent Application No. 201810153991.5 dated Aug. 31, 2020 with English translation (6 pages).
Office Action issued against corresponding Canadian Patent Application No. 2,901,755 dated Oct. 30, 2020 in English (4 pages).
Substantive Examination Clear Report issued against corresponding Malaysian Patent Application No. PI 2015002061 dated Nov. 12, 2020 in English (1 page).
Written Opinion and Search Report issued against corresponding Singaporean Patent Application No. 10201610543Q dated Sep. 8, 2020 in English (10 pages).
Office Action issued against corresponding Chinese Patent Application No. 201880013277 .4 dated Oct. 27, 2020 with English translation (42 pages).
Office Action issued against corresponding Chinese Patent Application No. 201680052645.7 dated Feb. 2, 2021 with English translation (5 pages).
Office Action issued against corresponding Australian Patent Application No. 2016308775 dated Feb. 25, 2021 in English (2 pages).
International Preliminary Report on Patentability issued for correspondence International Application No. PCT/CA2019/050960 dated Jan. 12, 2021 (4 pages).
Office Action issued against corresponding JP Patent Application No. 2018-526978 dated Apr. 22, 2021 with English translation (6 pages).
Office Action issued against corresponding EP Patent Application No. 14 754 894.5 dated Apr. 16, 2021 in English (5 pages).
Extended European Search Report issued against corresponding EP Patent Application No. 21152108.3 dated May 4, 2021 in English (7 pages).
Office Action issued against corresponding South Korean Patent Application No. 10-2016-7033280 dated Apr. 26, 2021 in English and Korean (23 pages).
Certificate of Grant issued for corresponding Malaysian Patent Application No. 2016001907 dated Oct. 27, 2020 in English (5 pages).
Notice of Grant of Patent issued for corresponding Chinese Patent Application No. 201810153991.5 dated Mar. 30, 2021 with English translation (4 pages).
Office Action issued against corresponding South Korean Patent Application No. 10-2021-7005101 dated Apr. 28, 2021 with English translation (7 pages).
Office Action issued against corresponding CN Patent Application No. 201880013277.4 dated May 27, 2021 with English translation (26 pages).

(56) References Cited

OTHER PUBLICATIONS

Office Action issued against corresponding IN Patent Application No. 201917030094 dated May 19, 2021 with English translation (7 pages).
Office Action issued against corresponding MX Patent Application No. MX/a/2017/013296 dated May 17, 2021 with English translation (10 pages).
Office Action issued against corresponding JP Patent Application 2018-505507 dated Jun. 14, 2021 with English translation (6 pages).
Office Action issued against corresponding CA Patent Application No. 2,901,755; dated Sep. 7, 2021 (3 pages).
Office Action issued against corresponding EP Patent Application No. 16836312.5 dated Aug. 27, 2021 (5 pages).
Office Action issued against AU Patent Application No. 2020260531; dated Aug. 19, 2021 (4 pages).
Office Action issued against AU Patent Application No. 2019283912; dated Sep. 27, 2021 (4 pages).
Brazilian Patent Office, Application No. BR112015020099-0; Office Action dated Oct. 6, 2021. (in Portuguese with English translation).
Extended European Search Report issued against International Application No. PCT/CA2016050954 dated Feb. 14, 2019.
Extended European Search Report issued against International Application No. PCT/CA2014050110 dated Jan. 20, 2017.
Examination Report dated May 17, 2022, in Brazilian Application No. BR112018002870-3, 9 pages.
Office Action dated Aug. 1, 2022, in Chinese Application No. 201980054125.3, together with English language translation thereof (36 pages).
Written Opinion dated May 2, 2022, in Singaporean Application No. 11202100236X, 6 pages.
Search and Examination Reports dated Apr. 28, 2022, in United Arab Emirates Application No. P6000248/2018, 12 pages.
Communication dated Mar. 25, 2022, in European Application No. 16836312.5, 4 pages.
Communication dated Feb. 25, 2022, in European Application No. 19833475.7, 6 pages.
Examination Report dated Mar. 16, 2022, in Brazilian Application No. BR112015020099-0, 6 pages.
Office Action issued against corresponding Japanese Application 2017-508717 dated Feb. 26, 2019 (English translation).
Information on Search Strategy.
Written Opinion of the International Searching Authority for International Application No. PCT/CA2016/050954 : dated Oct. 14, 2016, 8 pages.
International Search Report for International Application No. PCT/CA2016/050954 dated Oct. 14, 2016, 4 pages.
PCT International Search Report for International Application No. PCT/CA2014/050110 dated May 5, 2014, 4 pages.
First Office Action and Search Report for corresponding Chinese Patent Application No. 201680027827.9 dated Apr. 15, 2019 (English translation).
Chinese Office Action dated Jun. 19, 2018.
Office Action issued against corresponding Japanese Patent Application No. JP2015-558313 dated Mar. 6, 2018 (English translation).
International Search Report for PCT/CA2015/050369 dated Jul. 14, 2015 (4 pages).
Office Action issued against corresponding Chinese Application No. 201480022662.7 dated Jul. 18, 2017.
Written Opinion of the International Searching Authority for PCT/CA2015/050369 dated Jul. 14, 2015 (5 pages).
Extended European Search Report issued against corresponding International Application PCT/CA2015050369 dated Nov. 20, 2017.
Written Opinion issued by the Intellectual Property Office of Singapore for corresponding Singapore Application No. 11201506504W dated Mar. 21, 2016 (5 pages).
Written Opinion of the International Searching Authority for PCT/CA2016050434 dated Jun. 23, 2016.
International Search Report for International Application No. PCT/CA2018/050065 dated Apr. 16, 2018, 4 pages.
Written Opinion of the International Searching Authority for PCT/CA2018/050065 dated Apr. 16, 2018, 5 pages.
International Search Report for International Application No. PCT/CA2016/050434 dated Jun. 23, 2016.
Written Opinion of the International Searching Authority for International Application No. PCT/CA2014/050110 dated May 5, 2014.
English translation of Office Action issued against corresponding Japanese patent application 2018-218118, dated Dec. 17, 2019.
Substantive Examination Report issued by the Intellectual Property Corporation of Malaysia against corresponding Malaysian patent application PI 2016001907, dated Jan. 16, 2020.
Examination Report issued by Intellectual Property India against corresponding Indian patent application J01617036767, dated Feb. 21, 2020.
English translation of First Office Action issued against corresponding Japanese patent application 2017-508717, dated Dec. 24, 2019.
Form 2906 issued by EPO against corresponding EPO patent application 14,754894.5 dated Nov. 25, 2019 (in English).
Examination Report dated Jul. 28, 2022, for Indian App. No. 202147003273 (6 pages).
IMPI; Application No. MX/a/2018/001821; Office Action dated Mar. 11, 2022. (Related case; Machine translation).
KIPO; Application No. 10-2019-7024117; Office Action dated Feb. 24, 2022. (Related case; Machine translation).
Office Action dated Jun. 28, 2022, in Japanese Patent Application No. JP 2019-540006, with English language machine translation (5 pages).
CNIPA, Application No. 201880013277.4; Office Action dated Jan. 21, 2022. (in Chinese with English translation).
EPO; Application No. 18741568.2; Intention to Grant dated Oct. 18, 2021.
JPO; Application No. 2019-540006; Office Action dated Oct. 5, 2021.
Office Action Issued on basis of Art 35 in corresponding Brazilian Patent Application BR112019014771-3 (Portuguese with English translation) dated Nov. 1, 2022.
Office Action Issued against corresponding Mexican Patent Application No. MX/a/2019/008532 (Spanish with English Translation) dated Oct. 19, 2022.
Search Report dated Nov. 30, 2022, in Singapore Application No. 10201900884S (2 pages).
Written Opinion dated Dec. 1, 2022, in Singapore Application No. 10201900884S (6pages).
Office Action issued against corresponding Korean Patent Application No. 10-2018-7006810 dated Aug. 30, 2023 English Translation (16 pages).
Office Action issued against corresponding Japanese Patent Application No. 2022-016873 dated Sep. 28, 2023 English Translation (4 pages).
Office Action issued against corresponding United Arab Emirates Patent Application No. P6000248/2018 dated Sep. 19, 2023 English Translation (5 pages).
Search Report issued against corresponding European Patent Application No. 23 179 873.7 dated Oct. 20, 2023 in English (5 pages).
Office Action issued against corresponding Japanese Patent Application No. 2021-500562 dated Aug. 2, 2023 English Translation (6 pages).
Office Action issued against corresponding EP Patent Application No. 21152108.3 dated Sep. 12, 2023 (5 pages).
Office Action issued against corresponding BR Patent Application No. BR112021000532-3 dated Jun. 28, 2023 (8 pages).

* cited by examiner

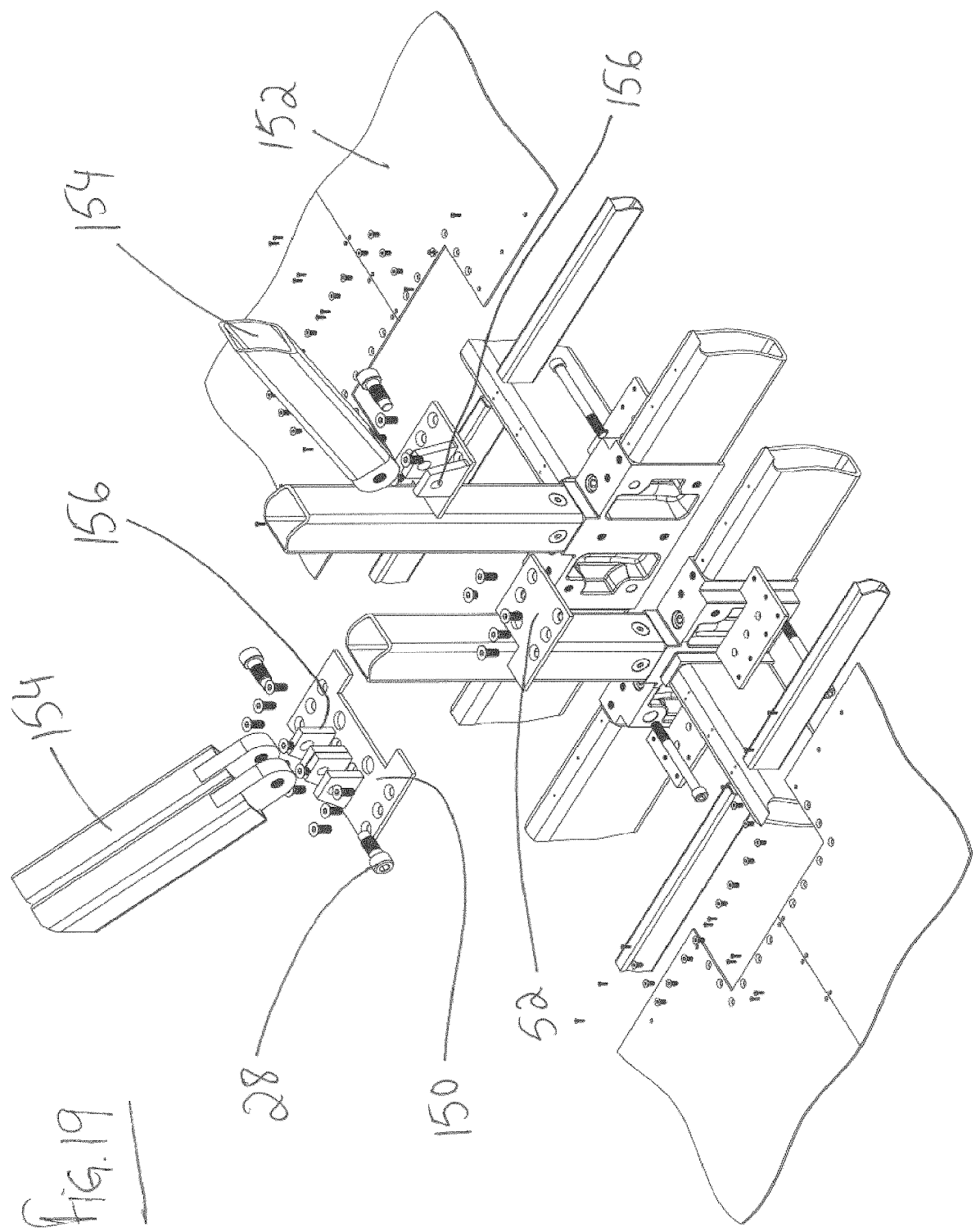

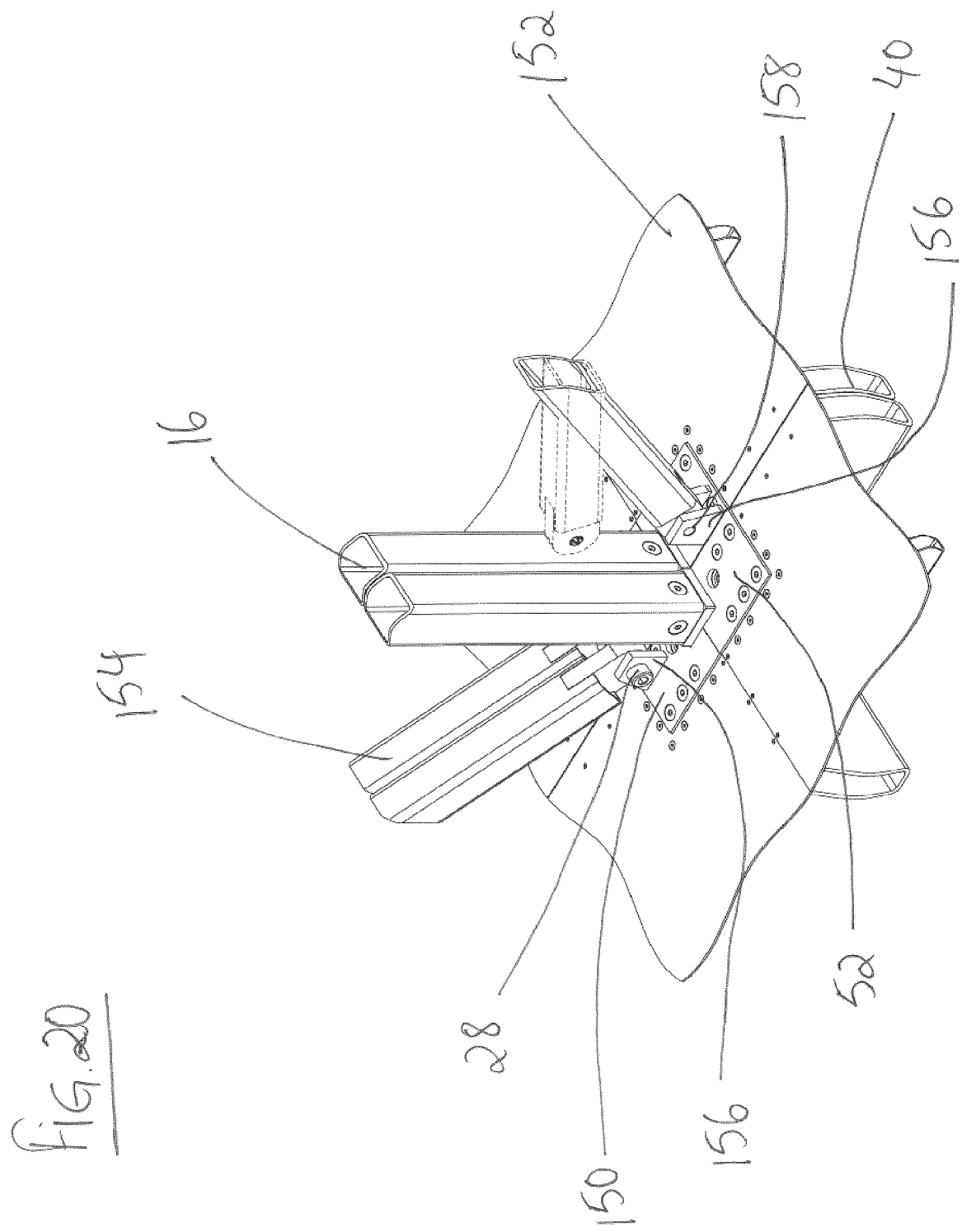

MODULAR BUILDING CONNECTOR

CROSS REFERENCE TO RELATED APPLICATIONS

This application is a Continuation Application of U.S. application Ser. No. 16/941,816, filed Jul. 29, 2020, which is a Continuation Application of U.S. application Ser. No. 16/479,034, filed Jul. 18, 2019, which is a U.S. national phase application filed under 35 U.S.C. § 371 of International Application No. PCT/CA2018/050065, filed Jan. 19, 2018, designating the United States, which claims the benefit of and priority to U.S. Provisional Patent Application No. 62/448,123 filed Jan. 19, 2017 under the title MODULAR BUILDING CONNECTOR. The contents of the above patent applications are hereby expressly incorporated by reference into the detailed description hereof.

FIELD

The invention relates to a connector, a connector assembly, a method for coupling modular frame units having the connector assembly, a method of assembling a modular unit having the connector assembly and a building having the connector assembly.

BACKGROUND

Prefabricating modular building units constructed from standardized components in a controlled factory setting can be desirable due to the lowered costs and the increased quality which is obtainable in comparison to performing similar work on an outdoor construction job site.

Thus prefabricated modular building units having a floor, walls and an overhead structure, and which contain all the systems and furnishings pre-installed within them are preferred and known in the art. Building assembly systems composed of the means and methods to join two or more modular building units together to form a larger structure are also known in the art.

PCT application numbers PCT/CA2014/050110, PCT/CA2015/050369, PCT/CA2016/050434 and PCT/CA2016/050954 (the contents of which are incorporated herein by reference) disclose connectors and connector assemblies that can be used for fabricating a modular unit and building.

There is a need in the art for a connector assembly that be used for coupling a pre-fabricated modular unit to a pre-existing modular building. In addition, there is a need in the art for a connector block that can be used to form the connector assembly described above. Further, there is a need in the art for a method of coupling a pre-fabricated modular unit to a pre-existing modular building to expand the footprint of the modular building.

SUMMARY

In one aspect, the specification relates to a connector assembly comprising an upper connector coupled to a lower connector and a gusset plate sandwiched between the upper and lower connectors, the lower connector having:
a lower connector body having a lower connector body column receiving end and a lower connector body gusset contact end, the column receiving end being adapted for receiving a first end of a first module frame and the gusset contact end being adapted for coupling to the gusset plate;

at least a pair of lower connector arms, each lower connector arm coupled to and extending from the lower connector body and having lower connector arm inner face, a lower connector arm outer face, a lower connector arm gusset contact face, a lower connector arm load bearing face and a lower connector arm beam contact face, the beam contact face being positioned distal from the lower connector body, each lower connector arm having at least one fixing aperture on the load bearing face for receiving a fastening means to couple the lower connector to the upper connector, and each lower connector arm having a hole formed that extends from the lower connector arm inner face to the lower connector arm outer face; and a lower connector arm boss coupled to and extending from the beam contact face of each arm, the boss having a lower connector arm weld receiving bevel extending from the distal end of the arm;

the upper connector having:
an upper connector body having an upper connector body column receiving end and an upper connector body gusset contact end, the column receiving end being adapted for receiving a first end of a second module frame and the gusset contact end being adapted for coupling to the gusset plate;

at least a pair of upper connector arms, each upper connector arm coupled to and extending from the upper connector body and having an upper connector arm inner face, an upper connector arm outer face, an upper connector arm gusset contact face, an upper connector arm load bearing face and an upper connector arm beam contact face, the beam contact face being positioned distal from the upper connector body; each upper connector arm having at least one upper connector arm fixing aperture for receiving a fastening means to couple the lower connector to the upper connector and at least one upper connector arm gusset coupling aperture for receiving a second fastening means to couple the upper connector to the gusset plate, and each upper connector arm having a hole formed that extends from the upper connector arm inner face to the upper connector arm outer face; and an upper connector arm boss coupled to and extending from the upper connector arm beam contact face of each upper connector arm, the boss having an upper connector arm weld receiving bevel extending from the distal end of the arm;

the gusset plate having:
a gusset plate first face, a gusset plate second face and gusset plate through holes for receiving the coupling and fastening means to couple the upper connector and the lower connector.

In another aspect, the specification relates to lower connector having:
a lower connector body having a lower connector body column receiving end and a lower connector body gusset contact end, the column receiving end being adapted for receiving a first end of a first module frame and the gusset contact end being adapted for coupling to the gusset plate;

at least a pair of lower connector arms, each lower connector arm coupled to and extending from the lower connector body and having lower connector arm inner face, a lower connector arm outer face, a lower connector arm gusset contact face, a lower connector arm load bearing face and a lower connector arm beam contact face, the beam contact face being positioned distal from the lower connector body, each lower connector arm having at least one fixing aperture on the load bearing face for receiving a fastening means to couple the lower connector to the upper connector, and each lower connector arm having a hole formed that extends from the lower connector arm inner face to the lower connector arm outer face; and a lower connector arm boss coupled to and extending from the beam contact face of each arm, the boss having a lower connector arm weld receiving bevel extending from the distal end of the arm;

In a further aspect, the specification relates to an upper connector having:

an upper connector body having an upper connector body column receiving end and an upper connector body gusset contact end, the column receiving end being adapted for receiving a first end of a second module frame and the gusset contact end being adapted for coupling to the gusset plate;

at least a pair of upper connector arms, each upper connector arm coupled to and extending from the upper connector body and having an upper connector arm inner face, an upper connector arm outer face, an upper connector arm gusset contact face, an upper connector arm load bearing face and an upper connector arm beam contact face, the beam contact face being positioned distal from the upper connector body; each upper connector arm having at least one upper connector arm fixing aperture for receiving a fastening means to couple the lower connector to the upper connector and at least one upper connector arm gusset coupling aperture for receiving a second fastening means to couple the upper connector to the gusset plate, and each upper connector arm having a hole formed that extends from the upper connector arm inner face to the upper connector arm outer face; and an upper connector arm boss coupled to and extending from the upper connector arm beam contact face of each upper connector arm, the boss having an upper connector arm weld receiving bevel extending from the distal end of the arm;

In another further aspect, the specification relates to a method of forming a connector assembly having a lower connector, an upper connector, a gusset plate, a second lower connector and a second upper connector, wherein the lower connector, the upper connector, the gusset plate, the second lower connector and the second upper connector are as disclosed herein, the method comprising the steps of:

positioning the lower connector, the upper connector, the gusset plate, the second lower connector and the second upper connector;

coupling the lower connector to the upper connector;

coupling the second lower connector to the second upper connector;

coupling the lower connector to the second lower connector; and coupling the upper connector to the second upper connector.

In still another further aspect, the specification relates to a method of coupling adjacent modular buildings, wherein the modular buildings together have a lower connector, an upper connector, a gusset plate, a second lower connector and a second upper connector, wherein the lower connector, the upper connector, the gusset plate, the second lower connector and the second upper connector are as disclosed herein, the method comprising the steps of:

positioning a first modular unit of a first modular building adjacent to a modular unit of the other modular building;

coupling the lower connector of the first modular unit of the first modular building to the second lower connector of the modular unit of the other building; and coupling the upper connector of the first modular unit of the first modular building to the second upper connector of the modular unit of the other building.

In still another further aspect, the specification relates to a modular building comprising a lower connector, an upper connector, a gusset plate, a second lower connector and a second upper connector, wherein the lower connector, the upper connector, the gusset plate, the second lower connector and the second upper connector are as disclosed herein.

Reference will now be made, by way of example, to the accompanying drawings which show example embodiments of the present application, and in which:

BRIEF DESCRIPTION OF THE DRAWINGS

Reference will now be made, by way of example, to the accompanying drawings which show example embodiments of the present application, and in which:

FIG. 19 shows an exploded partial perspective view of two adjacent modules having diagonal bracing before coupling of adjacent lower connectors; and FIG. 20 shows a partial perspective view of two adjacent modules having diagonal bracing after coupling of adjacent lower connectors;

Similar reference numerals may have been used in different figures to denote similar components.

DESCRIPTION

Figure 1:
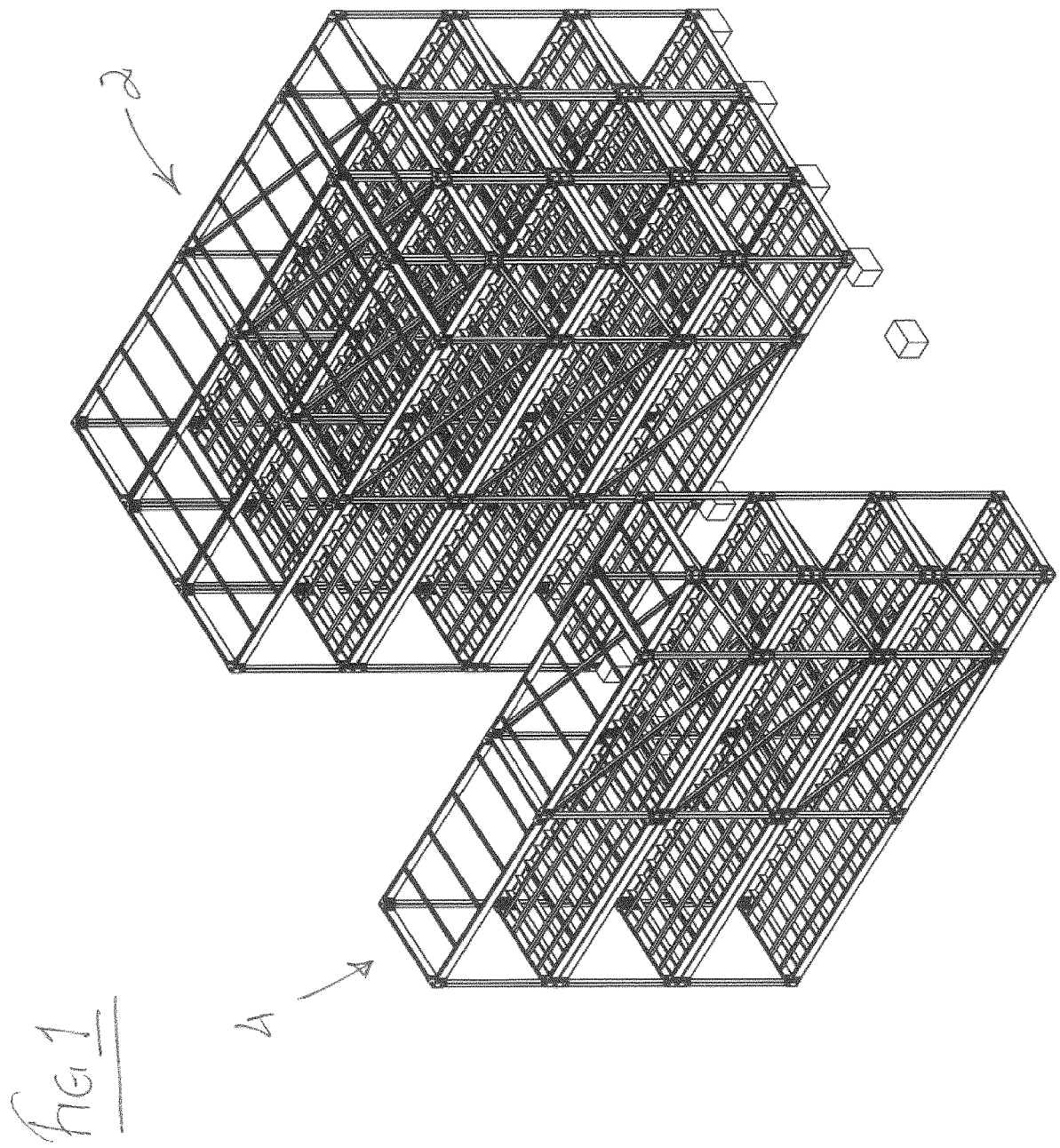
FIG. 1 is a perspective view of a pre-assembled modular unit for connection to a pre-existing modular building prior to coupling the two units.
Figure 2:
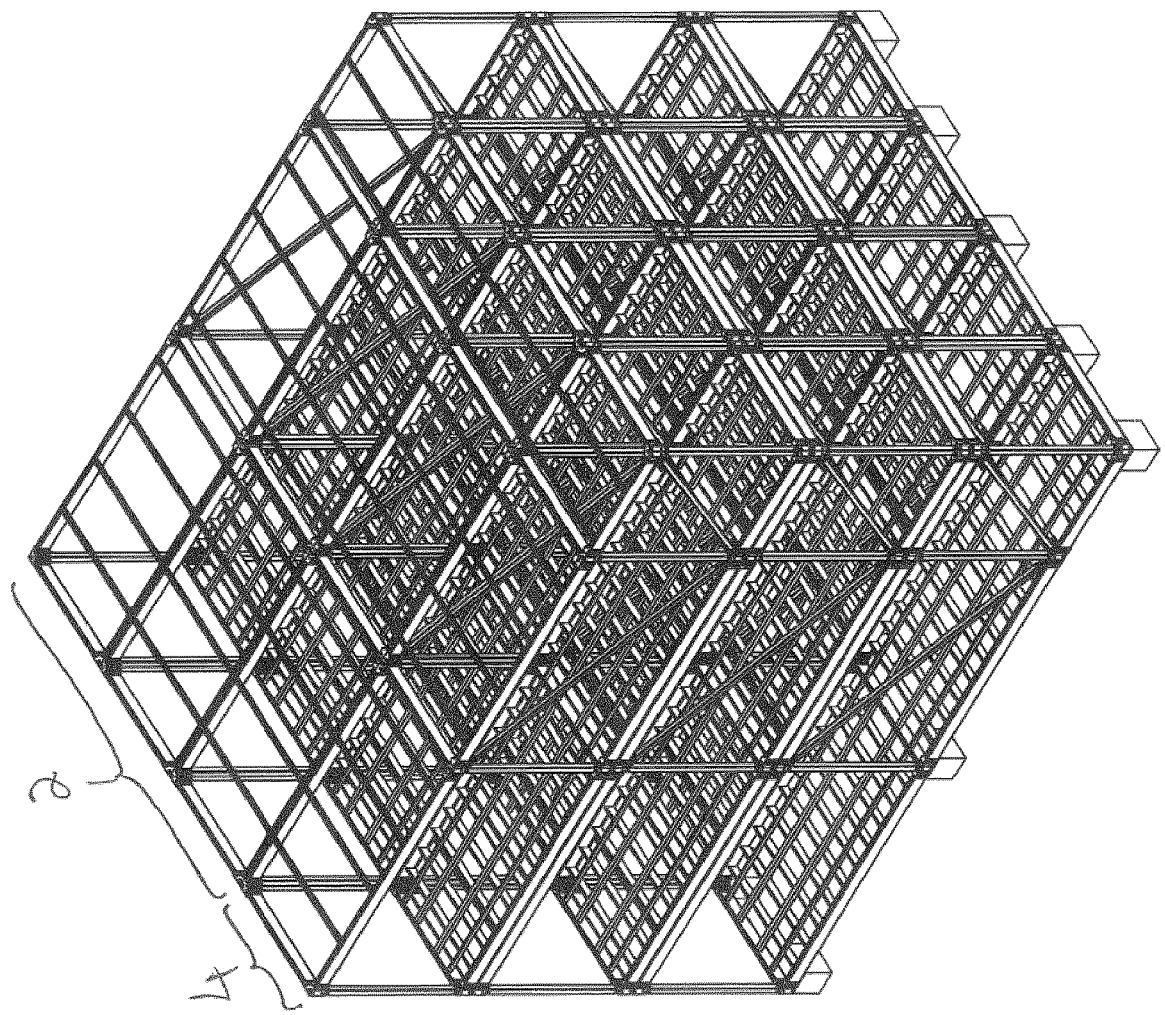
FIG. 2 is a perspective view of a modular building after coupling of a modular unit shown in FIG. 1.

A challenge exists with expansion of pre-existing modular buildings. For instance, where additional modular units are laterally attached to expand the footprint of a pre-existing modular building. FIG. 1 show a pre-existing modular building 2 having multiple floors. To expand the footprint of the building, multiple modules at different levels must be connected to the pre-existing modular building 2. To independently connect each module on every level to the pre-existing modular building 2 can be challenging, and also result in loss of structural strength of the final modular building. In addition, coupling a pre-fabricated modular unit 4 to a pre-existing modular building 2 to form an expanded modular building 6 (FIG. 2) can also pose its challenges. For instance, it can be difficult to connect the corner connectors of each module on every floor of the pre-existing modular building 2 with the corner connectors of each module on every floor of the pre-fabricated modular unit 4, while maintaining the overall structural strength and avoiding flexion at the interface of the modular building 2 and modular unit 4. In addition, a similar challenge can exist when coupling additional modules, one-by-one, to a pre-existing modular building, as coupling a connector assembly of the new module to be added to the connector assembly of the pre-existing modular building can be difficult, while maintaining structural strength.

PCT application numbers PCT/CA2014/050110, PCT/CA2015/050369, PCT/CA2016/050434 and PCT/CA2016/050954 (the contents of which are incorporated herein by reference) disclose connector assemblies, modular units, methods of coupling connectors and methods of constructing modular units and buildings, along with additional information that relates to the specification, including the connectors, disclosed herein.

The specification has been initially subdivided in to a section for each component or group of components for convenience in reading.

Corner Blocks

The specification discloses upper or lower load-bearing connectors or blocks, which in one embodiment are corner blocks. In a particular embodiment, the blocks are substantially quadrilateral and in other embodiments have polygonal or asymmetrical shapes. These blocks can be mass-produced with features that provide a multiplicity of functions so as to concentrate the precision operations in a small number and size of objects and reduce the amount and complexity of work that must be performed on other members. The upper and lower blocks can be of distinct forms and, in one embodiment, are located on the upper and lower ends of the vertical corner members (columns) of generally angular, tubular or built-up form, which perform the function of multi-story columns when modules so constructed are joined using the features on the blocks to form a larger or taller structure.

Likewise other features on the blocks engage the horizontal members of the building and perform the function of continuous horizontal members when modules so constructed are joined to form a larger or wider structure.

In a particular embodiment, the blocks have arms projecting at a plurality of angles including but not limited to perpendicular to the faces of the blocks providing for the location and welding of adjoining members at a plurality of angles. In a particular embodiment, the present invention thus facilitates the fabrication and erection of modules including but not limited to orthogonal, tapering, radiating and curving shapes. The threaded and unthreaded holes in the arms achieve the positioning of threaded fasteners and the vertical walls of the arms provide an increase in the load-bearing capacity and transmission of the compression and tension forces created by the forces acting on the building and by the action of the fasteners.

In a particular embodiment, the blocks have holes in both the body and the arms for the passage and receiving of bolts with nuts or are threaded to receive bolts, so as to provide continuity of vertical tension through the columns and a moment resisting interconnection between adjacent modules or other building structures. The tension resistance resulting from the connection of the columns in the vertical plane enables the structure to resist uplift where it occurs and produces friction on the gusset plate so as to convey forces to the lateral members in the horizontal plane with a high level of fixity.

More specifically, during assembly, the surface of the arms which bear against the gusset plate from both above and below are made tight.

In a particular embodiment, the bolts are accessible within the wall cavity or other such places and can be arranged flush or below the surface such that a removable patch can be easily configured to cover the location of the bolt and ensure continuity of the fireproofing materials surrounding the load-bearing structures. In a particular embodiment as with connection to the underside of a roof assembly, the bolts may be inserted from the bottom up.

In a particular embodiment, the blocks have projecting features on the distal end faces of the block located to provide backing for the assembly welding, reducing the structural impact of a weld to a connecting member that is cut too short or with an out-of square end or other imperfection reducing the probability of a worker executing a non-conforming welded connection between the corner blocks and the members which are welded to the block and a beveled feature so located on the outside of the block located so as to reduce the likelihood that a weld will require grinding so it does not project beyond the surface and conflict with an adjoining module.

The holes in the corner blocks provide a means of connection to tie-downs and hoisting devices. In a particular embodiment, the upper face of the block is prepared with an opening in to which a quick-release connector can be inserted so as to provide a means of quickly and dependably connecting and disconnecting the module to a lifting device.

In a particular embodiment the blocks have features on the contact faces which engage with corresponding features on the gusset plate so as to increase the resistance to slippage along the contact plane as might occur during a seismic event.

In a particular embodiment, the blocks have projecting flanges co-planar with the faces to which floor or ceiling finishes are to be applied to provide a continuous backer in the area of the fastener access leave-out so as to improve air-tightness and provide support to the flooring or ceiling material. In use, the flooring material covers the top face of the frame up to the end of the arms of the block, but is cut away at the block to expose the top face to allow for the insertion of the bolts for assembly. This can leave the flooring unsupported. The flange shown can help to support the floor in that area and to create a continuous surface so there is no crack in the sealing between floors, which can help with fireproofing.

In a particular embodiment the blocks have a multiplicity of holes on the vertical surface for the connection of accessories such as balconies, hallways and facade treatments.

In a particular embodiment, the blocks have one, two, three or more holes for the passage of vertical tension fasteners and there is one such hole for each vertical structural member which may be centered above it. In another particular embodiment, there are two or more holes for each vertical member. The length of the arms on the blocks through which the fasteners pass and the length of the arms on the gusset plate between the blocks vary in relation to the number of such holes.

In a particular embodiment the lower block has openings through the face so as to reduce the amount of steel which must be drilled or otherwise removed from the casting to allow passage of the bolts. In combination with this feature or separately the block may be reinforced with ribs to as to augment the load bearing capacity and resistance to twisting.

Another component is a block having features on its one end prepared to receive a tubular structural member of one dimension and having features on the other end prepared to receive a tubular member of another dimension, or the corresponding features of a block, and having tapered sides and internal ribs or other reinforcing means so as to transmit the forces between the two members without distorting. As previously described in the PCT applications noted above, it can be desirable to change sizes of columns in relation to the load. Smaller columns are used in the upper parts of the building where loads are smaller, larger columns in the lower parts where load are higher due to the accumulated gravity load and increased overturning forces.

Another component is a block configured so as to allow a column fabricated from plate to be welded to its exterior vertical faces so as to bear directly on and connect to a connection prepared in a similar manner or a block of the types previously described. As can be appreciated by someone knowledgeable in the art two or more such columns joined in to a T or X configuration can achieve both large weights per foot and increased cross-section resulting in greater buckling resistance without projecting in to the occupied spaces of a building.

Gusset Plate

Another component is a plate which is interposed between the blocks at the top and bottom ends of columns or groups of columns, which has upward-facing tapered locating pins for engaging and directing a descending module by sliding contact with a corresponding locating recess on the underside of a the corner block thus locating the module in the correct position for fastening. The plate also provides through holes for use in connecting adjacent modules with bolts to provide structural continuity in the horizontal plane both during construction and in the completed building and by virtue of its ductility, for accommodating slight variations in column length so as to ensure a continuous load path which bears equally on all members of the column group thus formed. As can be appreciated by someone knowledgeable in the art, the plate can be shaped to fit between a single vertical column or between two or more columns arranged in an orthogonal or other disposition. In a particular embodiment shims of a similar dimension and prepared with appropriate holes are placed in one or both sides of the connection to accommodate for variations in the finished dimensions of the modules thus maintaining the correct geometry of the modules stack.

In a particular embodiment, the gusset plate is provided with projections on its upper and lower faces which engage with corresponding grooves in the contact faces of the blocks above and below so as to increase the resistance to sliding movement as might occur during a seismic event and reduce the load which such movement would apply to the shanks of the vertical tension fasteners.

In addition to the gusset plate interposed between connectors at the top and bottom end of columns, a second gusset plate can also be used to connect adjacent top connectors or bottom connectors. The second gusset plate used can have holes to receive fastening means, such as bolts, to affix the second gusset plate to two adjacent top connectors, or two adjacent bottom connectors, as described further herein.

Stairwells and Elevator Shafts

The system disclosed herein allows for the fabrication of modules within which are installed stairs or elevating devices and which separate at the mateline between two modules without a significant visual or functional disruption.

Overheight Modules

The system disclosed herein allows for the fabrication of modules which comprise the upper and lower halves of habitable volumes which are taller than shipping restrictions will normally allow and which are joined at the mateline between two or more stacked modules without a significant visual or functional disruption.

Hallways

Another group of components disclosed is a structural hallway floor that is made from a suitable material such as reinforced concrete, sandwich plate, wood or formed metal together with supporting pedestals. In a particular embodiment, the slab is composed of reinforced concrete with reinforcement bars placed so that features on the support pedestals engage them so as to resist bending of the pedestals, thus creating a moment connection between stacks of adjacent modules thus connected. The pedestals are provided with holes that align with corresponding holes in the upper and lower corner blocks and serve to connect two parallel stacks of modules as well as connecting the adjacent columns within a stack on one side so as to create a combined load path. The pedestals and floor slabs may also be connected to the sides or ends of a stack of modules on one side of the slab and a balcony support frame on the outside to form a building with balconies or breezeways. The floor slab and pedestal assemblies can also be used as convenient carriers for building services such as ducts, pipes and wiring to facilitate the fabrication of these components off site in the factory environment.

In a particular embodiment the gusset plate can be extended as required and provided with holes for the passage of fasteners to support and engage accessory support and connection assemblies of a variety of sizes.

System of Interdependent Detailing

The present invention also comprises a pre-determined grid upon which the dimensioning of the interconnected elements of subject building are based together with a system of fixtures which ensure the grid is maintained throughout all fabricated assemblies in all axes which ensures an accurate and interdependent relationship extending from corner blocks, to members, to subassemblies, to modules and to whole buildings in all axes. The dimensioning system thus serves to reduce fractional element and module sizing, to increase the number of common parts and to reduce the difficulty of coordination with foundation and podium contractors and which facilitates the work of all internal or external suppliers of components to be integrated in the modules so fabricated.

In a particular embodiment, the system is based on increments of no more or no less than two inches in three axes with a centre-to-centre accuracy between holes used for fastening of plus or minus 1/32" and an outside to outside dimensional accuracy of all mating surfaces of plus 0" minus 1/16".

Fixtures

The present invention includes a system for the assembly of the module frames which ensures that modules conform to the grid established above, and that no part of a module projects beyond the outermost ideal dimension, which increases the achievable speed of assembly and accuracy of the structure and, eliminates the possibility of additive dimensional drift, resulting in a reduction in the difficulty of erection, the difficulty of fireproofing, the possibility of interconnecting modules with a greater degree of fixity and a reduction in wall thickness and wasted space.

Reinforcing Members

Further the invention comprise a system of standardized reinforcing members which connect with each other and with the columns, lateral framing, diagonal bracing and corner blocks described herein, eliminating the need for case-by-case design and fabrication or customization of reinforcement components.

Reinforcement Analysis

Further, the present invention comprises a work method for systematically analyzing the forces acting on a building composed of modules, defining the optimum location for the application of the standardized reinforcing systems, selecting from a list of standardized reinforcements with progressive buckling and uplift resistance and thereby incorporating only such reinforcements as are minimally necessary to strengthen the areas under additional stress, without adding unnecessary structural material to more locations than required, without significantly disrupting the application of fireproofing materials and without requiring additional thickness of the walls of the module.

Built Up Columns

Further, the present invention comprises a method for the fabrication and connection of the outer columns so they form groupings with greater resistance to the compressive and tensile forces resulting from the loads encountered in the construction of tall and/or slender buildings.

In a particular embodiment the resistance to horizontal drift, buckling and uplift of the columns is increased by joining two or more columns by welding along their vertical edges or other suitable means in to groups and welding or otherwise attaching these groups to the connector blocks in the areas provide for the purpose.

In a particular embodiment the columns are comprised of plates joined by welding or other suitable means along their edges and these assemblies are welded or otherwise joined to the blocks. In a particular embodiment these plates are 1" or more in thickness. In another particular embodiment, the plate columns by-pass the blocks to which they are welded and make contact with the top and bottom faces of the gusset plate along the ends of the plates.

In a particular embodiment the columns are progressively larger and engage blocks having correspondingly larger bodies and connection features. In a particular embodiment these columns are 4" square, 6" square, 8" square, 10" square, rectangular and so on, or the metric equivalents, corresponding to standard structural hollow metal or composite sections.

Benefits

Increases Height without Frame

By eliminating the risk of inadvertently creating a connection which is not fully compressed during assembly and which is therefore not fully fixed, and by providing for a larger number of fasteners, and by facilitating the placement of the reinforcement, the system of components and work methods of the present invention can serve to increase the height of a building which can be built without the requirement for a secondary external or internal bracing frame, and to increase its usable floor area due to involving a larger portion of the members in the structural function and the enhanced fixity of the connections, the creation and assurance of multiple and redundant load paths, the integration of the brace frame in to the module walls and the resulting efficient transfer of the external, internal and self-loads imposed on the completed building through the adjacent modules and thence to the ground.

Increases Height with Frame

By reducing the amount of steel required in upper floors and thus its total weight, this invention also serves to increases the height of a building which is built with the use of a secondary external or internal bracing frame of a given size.

Reduces Number of Unique Parts, Number of Locations and Size of Members

By analyzing the loads applied and more efficiently involving more of the required members in the structural function the invention also reduces the size of members required and limits the number, size and locations where unique reinforcement details and the related complexity of the fireproofing is required, thereby reducing the cost of such buildings.

Reduces Requirement for Precision

The present invention can help to further reduces the precision of the parts which must be made by workers in the modular production facility, which reduces the cost of the fabrication.

Reduces Complex Fabrication

The present invention concentrates many of the complex features required to join members, hoist modules and join modules in a single mass-produced component, helping to reduce both the complexity and the requirement for skilled work necessary to construct a module.

Allows Taller and Wider

Additionally the system can allow the building of taller modules composed of two stacked frames one of which has openings in the ceiling and the other of which has openings in the floor, longer modules due to the performance of the bracing and wider modules due to the improved behavior of the apertures in the ends, thus providing greater flexibility to designers of buildings so constructed.

Reduces Wall Thickness

By better perfectly distributing the load-bearing components the present invention can help to reduce the wall thickness required to accommodate structure and services.

Reduces Site Labour for Patching

By placing the tension connections within the wall cavity and concentrating the connection means in the vicinity of the column, the present invention can help to reduce both the number and the extent of the leave-out areas which must be subsequently patched.

The invention in accordance with an embodiment disclosed in the specification will now be described with reference to the accompanying drawings.

Figure 3:
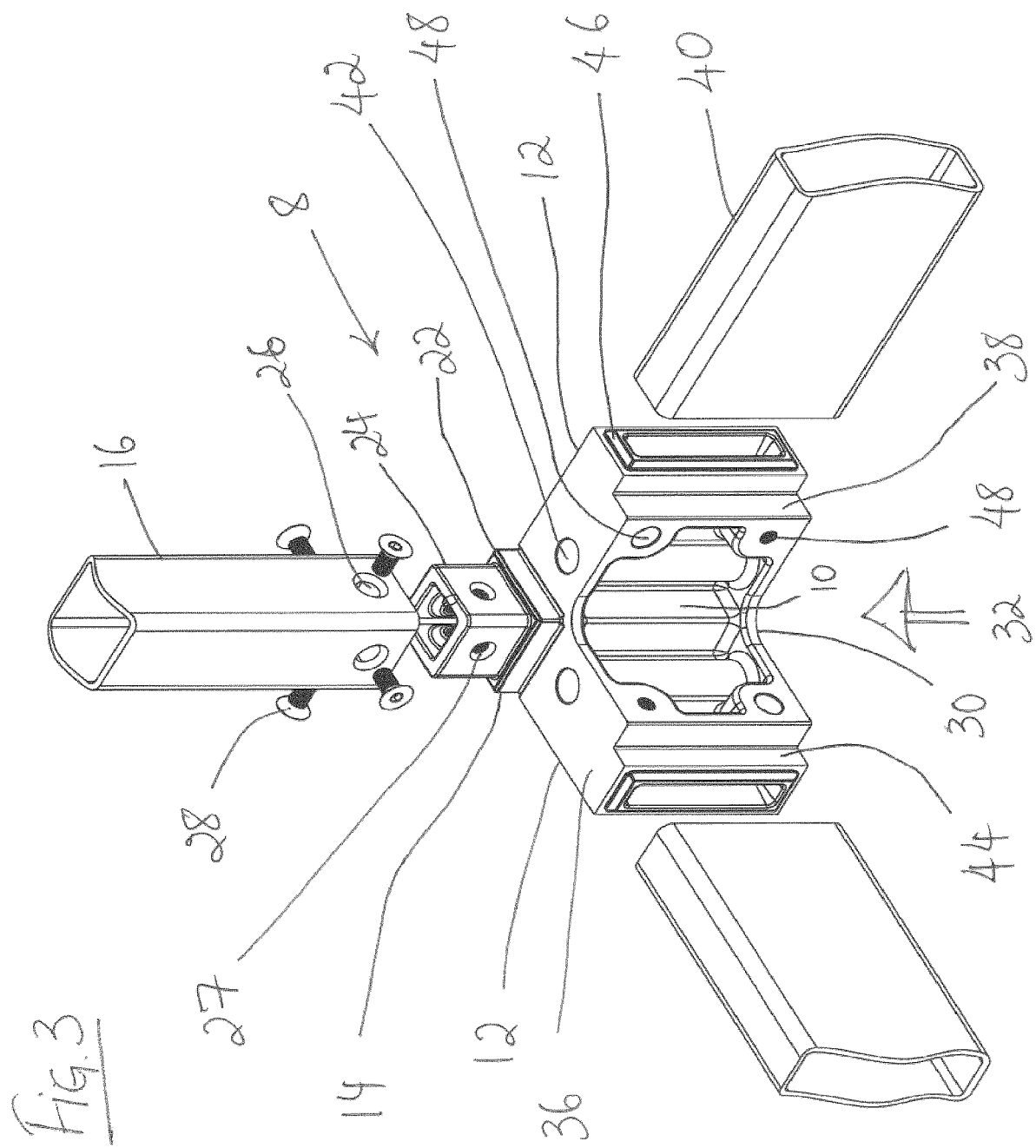
FIG. 3 is an exploded perspective view of a 90° connector with a partial column and partial hollow structural sections (HSS)

FIGS. 3 (exploded view) and 4 (assembled) disclose a 90° lower corner connector 8 (or block) that can be used to form the corner connector assembly disclosed herein. The lower connector is generally made up of lower connector body 10, with arms 12 extending at 90° to each other from the lower connector body 10. The lower connector body 10 at one end, designated as the lower connector body column receiving end 14, is adapted for receiving and coupling to a column 16, post or other structural unit of a modular frame; while the other end, designated as the lower connector body gusset contact end 18, is adapted for coupling to a first gusset plate 20 (as described herein).

In one embodiment, the lower connector column receiving end 14 can be provided with features that can assist in coupling a column 16, post or other structural unit, such as weld receiving bevel and weld backer extending from the lower connector body weld receiving bevel, as described in PCT application numbers PCT/CA2014/050110, PCT/CA2015/050369, PCT/CA2016/050434 and PCT/CA2016/050954 (the contents of which are incorporated herein by reference). Such features can assist with proper placement of column 16, post or other structural unity and for forming a weld, and can in some embodiments, avoid requiring any modification of the column, post or other structural unit.

In the embodiment disclosed herein, the lower connector body 10 is provided with a lower connector body weld receiving bevel 22, and a weld backer 24 extending from the weld receiving bevel 22. The lower connector body weld backer 24 can have a cross-section similar to the cross-section of the column 16, however, the weld backer 24 is sized such that it can be inserted into the hollow structural section (HSS) to ensure proper alignment of the column. In addition, the column 16 can have holes 26 that can align with precision drilled holes 27 in the weld backer 24, such that after alignment of the holes 26 in the column 16 with holes 27 in the weld backer 24, the column can be affixed in place using fastening means 28, such as screws or bolts, while ensuring proper positioning of the column 16.

The lower connector body 10 is also provided with a lower connector body gusset contact face 18 at the lower connector body gusset end 30, and that can come in contact with a first gusset plate 20, as described herein. In the embodiment disclosed herein, the lower connector body gusset contact face 18 is generally planar. In one embodiment, for example and without limitation, the lower connector body gusset contact face 18 can be provided with weep channels that can allow for drainage of any water, condensate or other liquid out of the lower connector 8.

Figure 4:
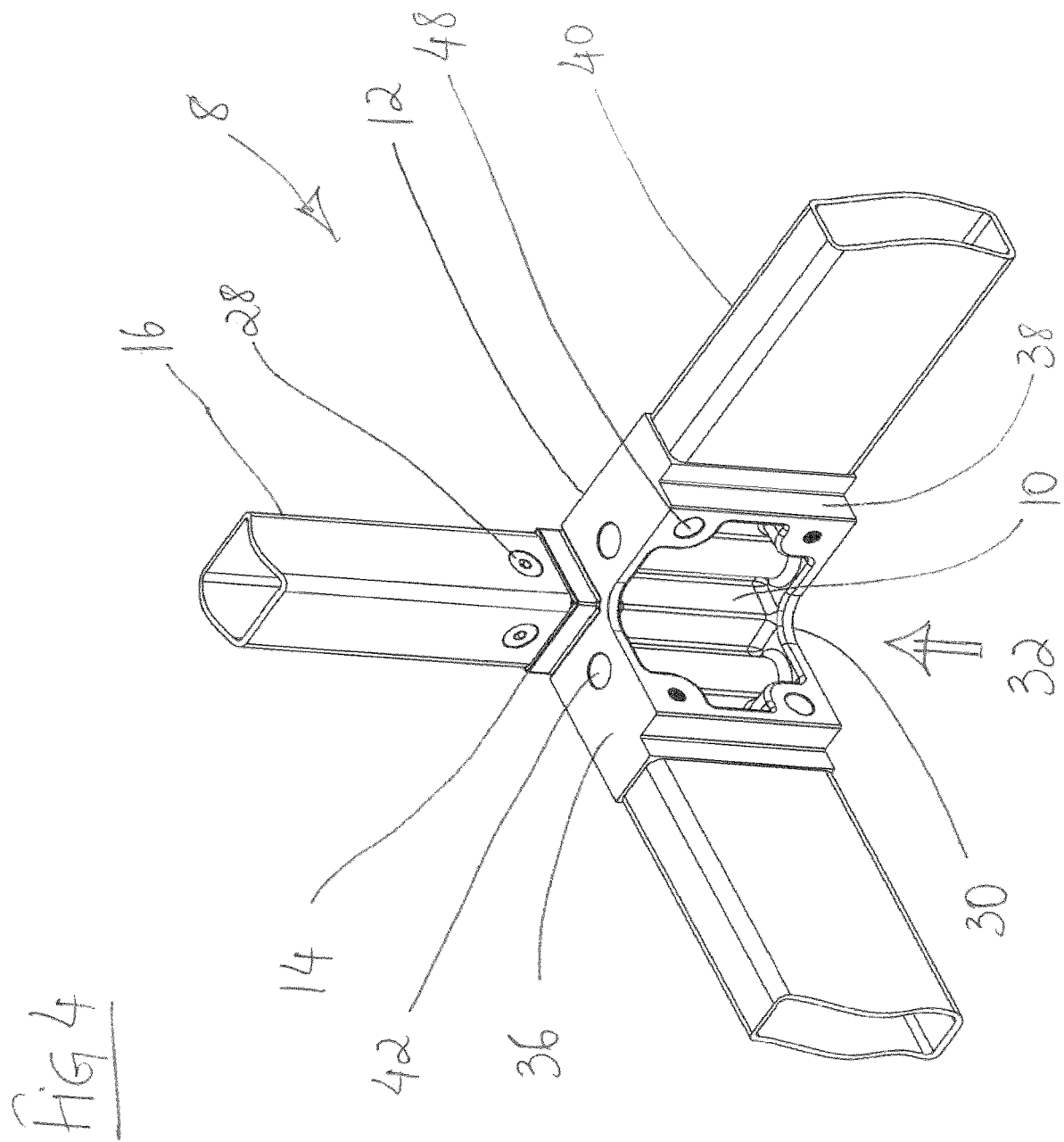
FIG. 4 is an assembled perspective view of a 90° connector with a partial column and partial hollow structural sections (HSS)

In the embodiment shown in FIGS. 3 and 4, the lower connector 8 is provided with a pair of lower connector arms 12 extending from the lower connector body 10. In addition, the arms are positioned to be perpendicular to each other, i.e., one arm extends at nearly 90° to the second arm. However, the position of the arms can be varied depending upon the design and application requirements, and the arms can be present at angles less than or greater than 90°. For instance, FIGS. 5 and 6, disclose a lower connector 8, where the arms 12 extend (in opposing directions) at 180° relative to each other.

Due to the placement of the lower connector 8 in a modular structure (FIGS. 1 and 2), the lower connector 8 is provided with a lower connector inner face 32 and a lower connector outer face 34. The lower connector inner face 32 is designated by the modular structure that is formed, with the face 32 of the connector 8 being positioned towards the insider of the modular structure being considered as the lower connector inner face 32, and the face of the lower connector 8 positioned away from the inside (or towards the outside) of the modular structure being designated as the lower connector outer face 34.

In the embodiment shown, the lower connector arms 12 has a lower connector arm load bearing face 36 and lower connector arm beam contact face 38, which can engage a beam 40 or other structural unit to form the modular structure. In the embodiment shown, the lower connector arm load bearing face 36 lies is a plane different than the plane of the lower connector body column receiving end 14, with the plane of the lower connector arm load bearing face 36 being more closer to the plane having the lower connector body gusset end 30 than the plan of the lower connector body column receiving end 14. This result in the lower connector arm load bearing face 36 being spaced-apart from the lower connector body column receiving end 14, and can help with the weld operation to form the modular structural unit.

The lower connector arm 12 can be provided with holes 42 that can be used for coupling of the lower connector 8 to the upper connector 102, and for forming the connector assembly 100, disclosed herein. In one embodiment, as disclosed in the Figures, the holes 42 can be positioned closer to the lower connector inner face 32, which can help to provide a lower connector arm load bearing surface 36 positioned closer to the lower connector outer face 34. The lower connector arm load bearing surface 36 can provide an area on the arms 12 for positioning and bearing the load of additional structural features of a modular structure. In another embodiment, there can be more holes or less holes as required by the loads to be transmitted and the positioning of load bearing elements bearing upon the surfaces of the blocks.

The arms 12 of the lower connector 8 are also provided with a boss 44 extending from the lower connector arm beam contact face 38, which is positioned at a distal end of the arms 12 that extend from the lower connector body 10. The boss 44 can be provided with features for coupling of the lower connector arm 12 to the beam 40 or other structural unit of a modular frame. In one embodiment, the boss 44 is provided with a lower connector weld receiving bevel 46, and which can assist in forming a weld with a beam 40 or other structural unit of a modular frame.

In one embodiment, for example and without limitation, the boss 44 can be positioned towards one side of the beam contacting face 38 of the lower connector arm 8. In the embodiment shown in the figures, the boss 44 is positioned proximate to the outer face 34 of the lower connector 8, and is also spaced from the edge of the lower connector arm 12 close to the lower connector inner face 32. By positioning the boss 44 close to the outer face 34, a channel is provided on the beam contacting face 38 of the lower connector arm 12 close to the inner face 32. The channel can provide space for passing wires or other conduits in a modular structure.

Figure 5:
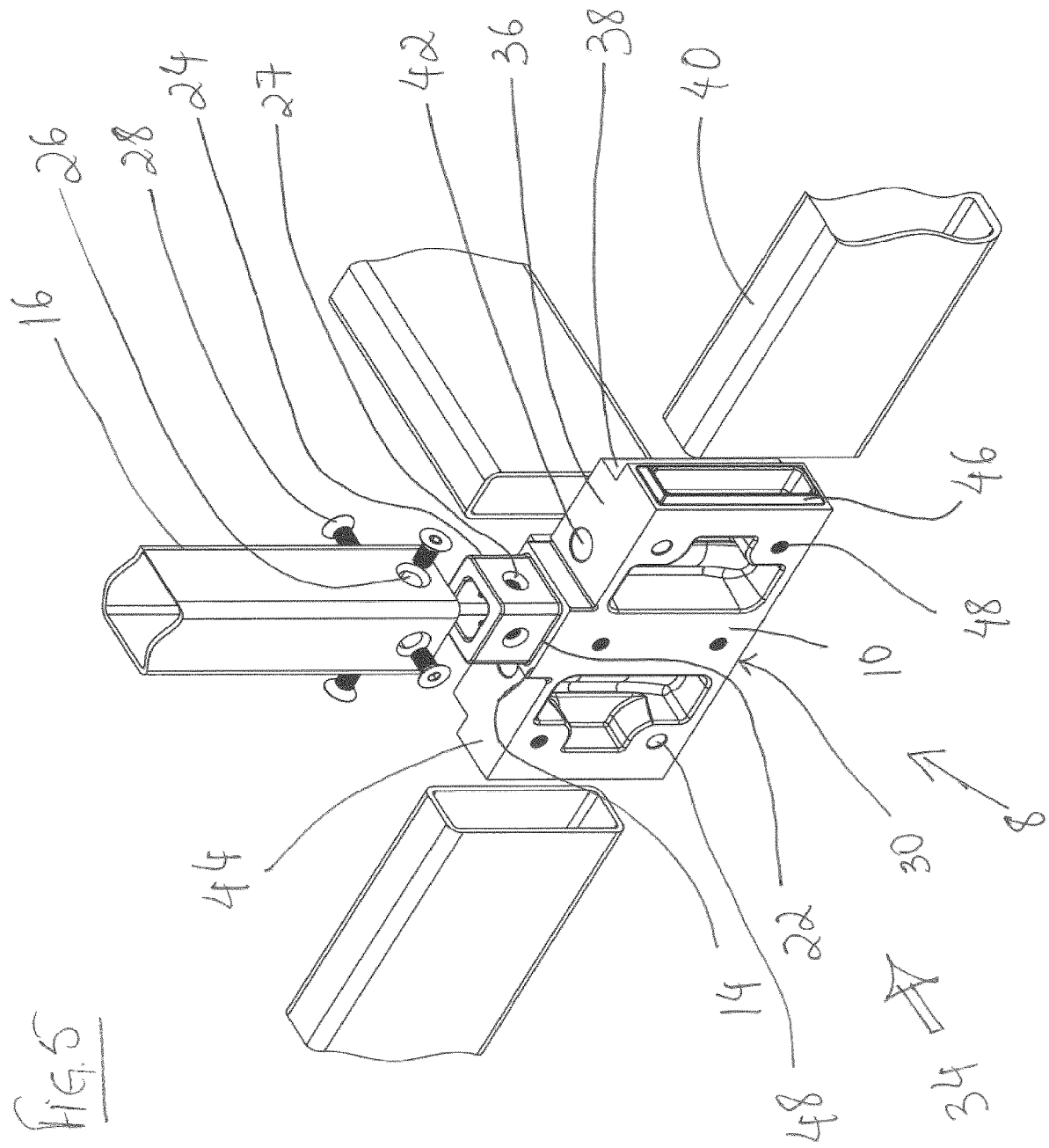
FIG. 5 is an exploded perspective view of a 180° connector with a partial column and partial hollow structural sections (HSS)
Figure 6:
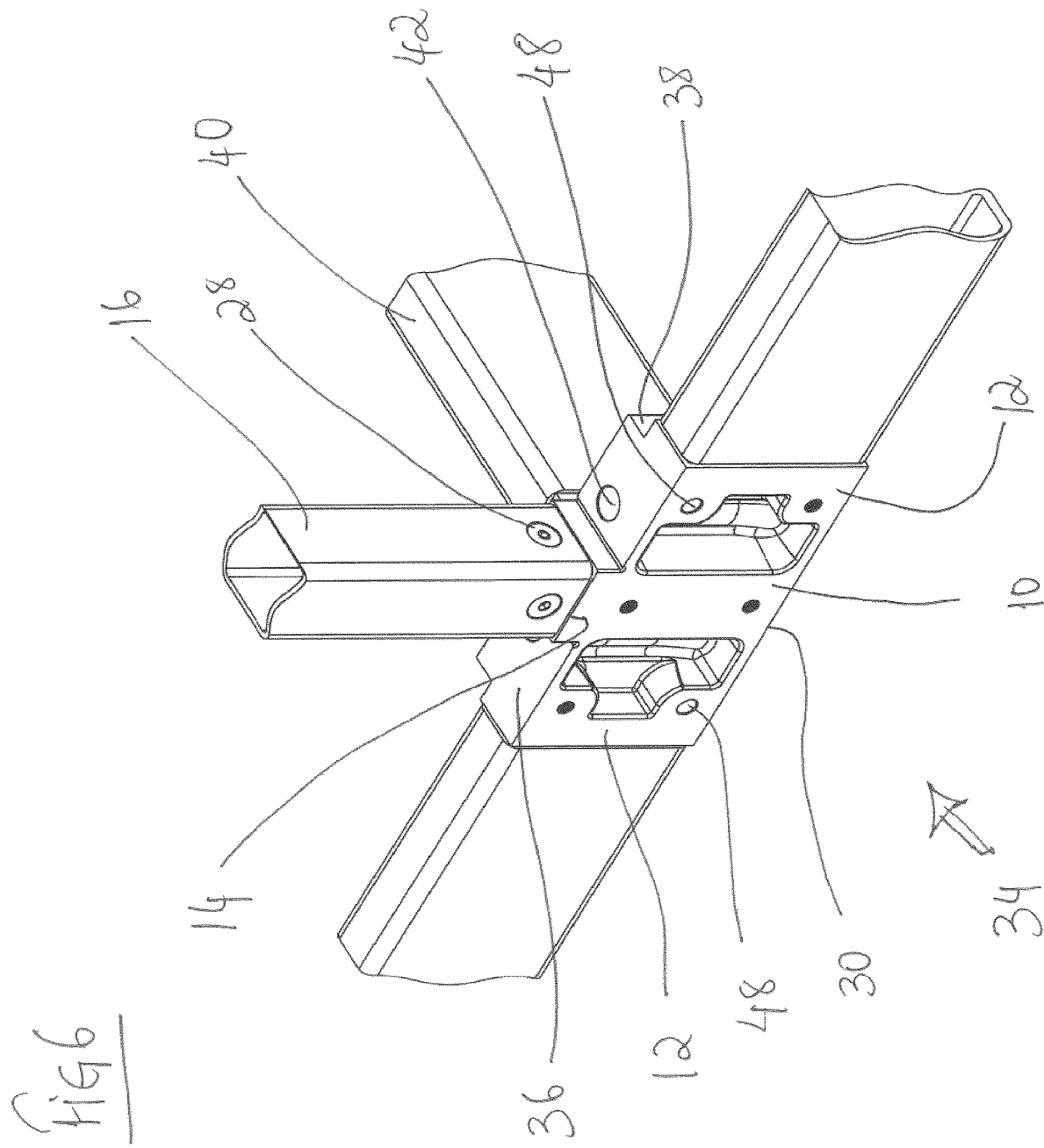
FIG. 6 is an assembled perspective view of a 180° connector with a partial column and partial hollow structural sections (HSS)

FIGS. 5 and 6 show a second embodiment of a lower connector 8 having features similar to the lower connector 8 embodiment disclosed in FIGS. 3 and 4. The embodiment disclosed in FIGS. 5 and 6 have arms extending in opposing directions, rather than being perpendicular to each other as shown in FIGS. 3 and 4. The direction of the arms 12 is not particularly limited and can vary depending upon the application and design requirements, as should be recognized by a person of skill in the art based on the teaching in this specification.

In addition, the arms 12 of the lower connector 8 can have one or more holes 48 formed, extending from lower connector inner face 32 to the lower connector outer face 34. The one or more holes 48 can receive fastening means 28 that allow for coupling of the lower connector 8 to an adjacent lower connector, as described further herein.

The upper connector 102 disclosed and used to form the connector assembly 100 has features similar to the lower connector 8, described above. Additional details of the upper connector 102 can be found in PCT applications numbers PCT/CA2014/050110, PCT/CA2015/050369, PCT/CA2016/050434 and PCT/CA2016/050954 (the contents of which are incorporated herein by reference). In addition, the upper connector 102 can have holes 50 extending from inner face to the outer face of upper connector arm 104 (similar to that seen in the lower connector), that allow for coupling of the upper connector 102 to an adjacent upper connector, as described further herein.

Figure 7:
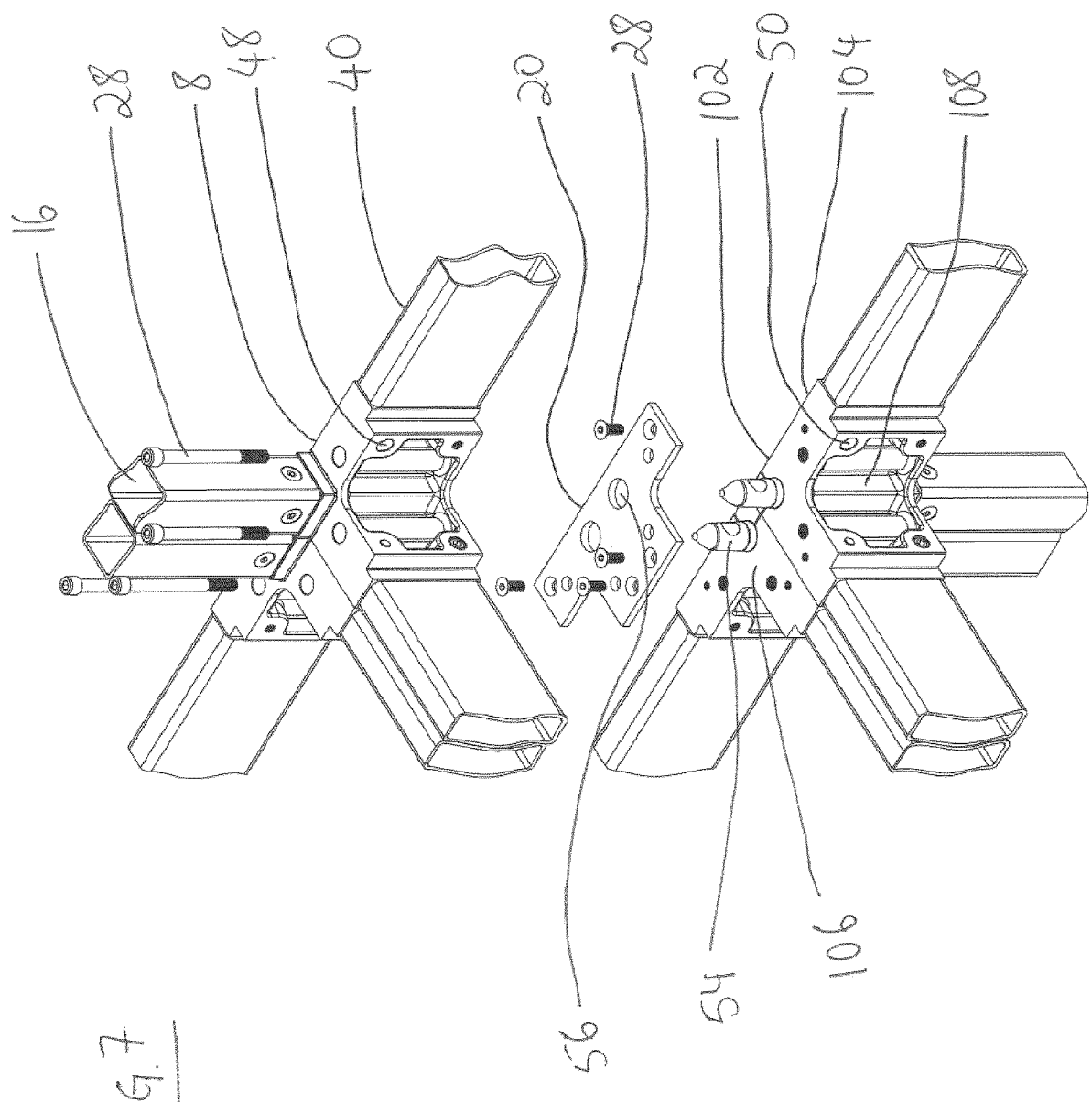
FIG. 7 is an exploded perspective view of two adjacent 90° connector assemblies with partial columns and partial hollow structural sections (HSS)
Figure 8:
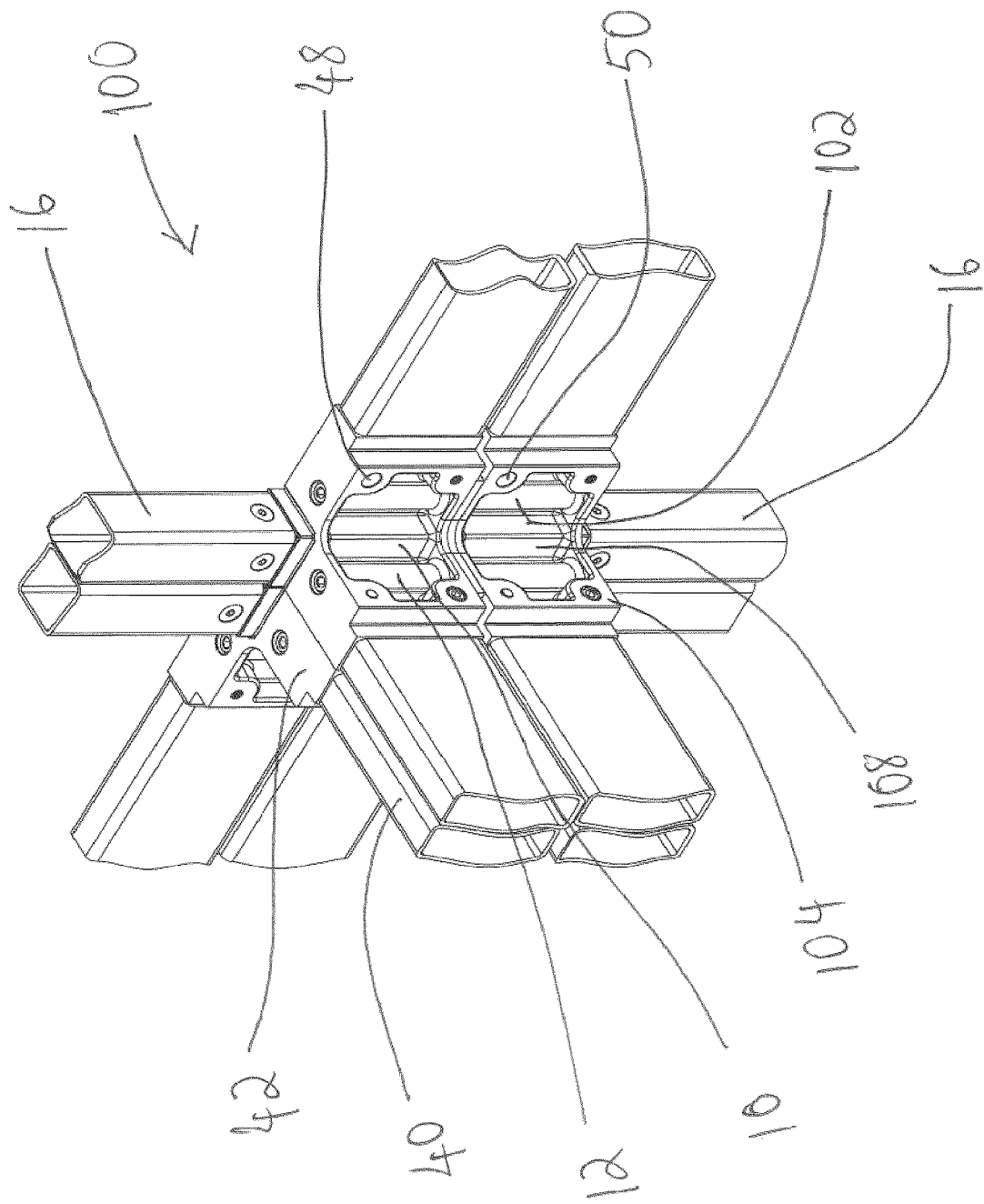
FIG. 8 is an assembled perspective view of two adjacent 90° connector assemblies with a partial column and partial hollow structural sections (HSS)

FIGS. 7 (exploded) and 8 (assembled) show a connector assembly 100 in accordance with an embodiment disclosed herein, where a pair of adjacent lower connectors 8 is coupled to a pair of adjacent upper connectors 102, sandwiching a gusset plate 20 in between. Each of the upper connectors 102 have a pin 54 coupled to the upper connector gusset contact face 106. As described in PCT application numbers PCT/CA2014/050110, PCT/CA2015/050369, PCT/CA2016/050434 and PCT/CA2016/050954 (the contents of which are incorporated herein by reference), the pin 54 is inserted in holes 56 in the gusset plate 54, and then the pin 54 engages holes (not shown) in the lower connector gusset contact face 18, to ensure proper alignment when forming the connector assembly 100.

To extend the footprint on an existing modular structure 2 by addition of a module unit 4 having multiple floors, the lower connectors in the existing modular structure 2 can be coupled to lower connectors in the module unit 4 that will lie adjacent to each other, upon assembly. Similarly, the upper connectors in the existing modular structure 2 can be coupled to upper connectors of the module unit 4 to form the expanded modular building 6, shown in FIG. 2.

Figure 9:
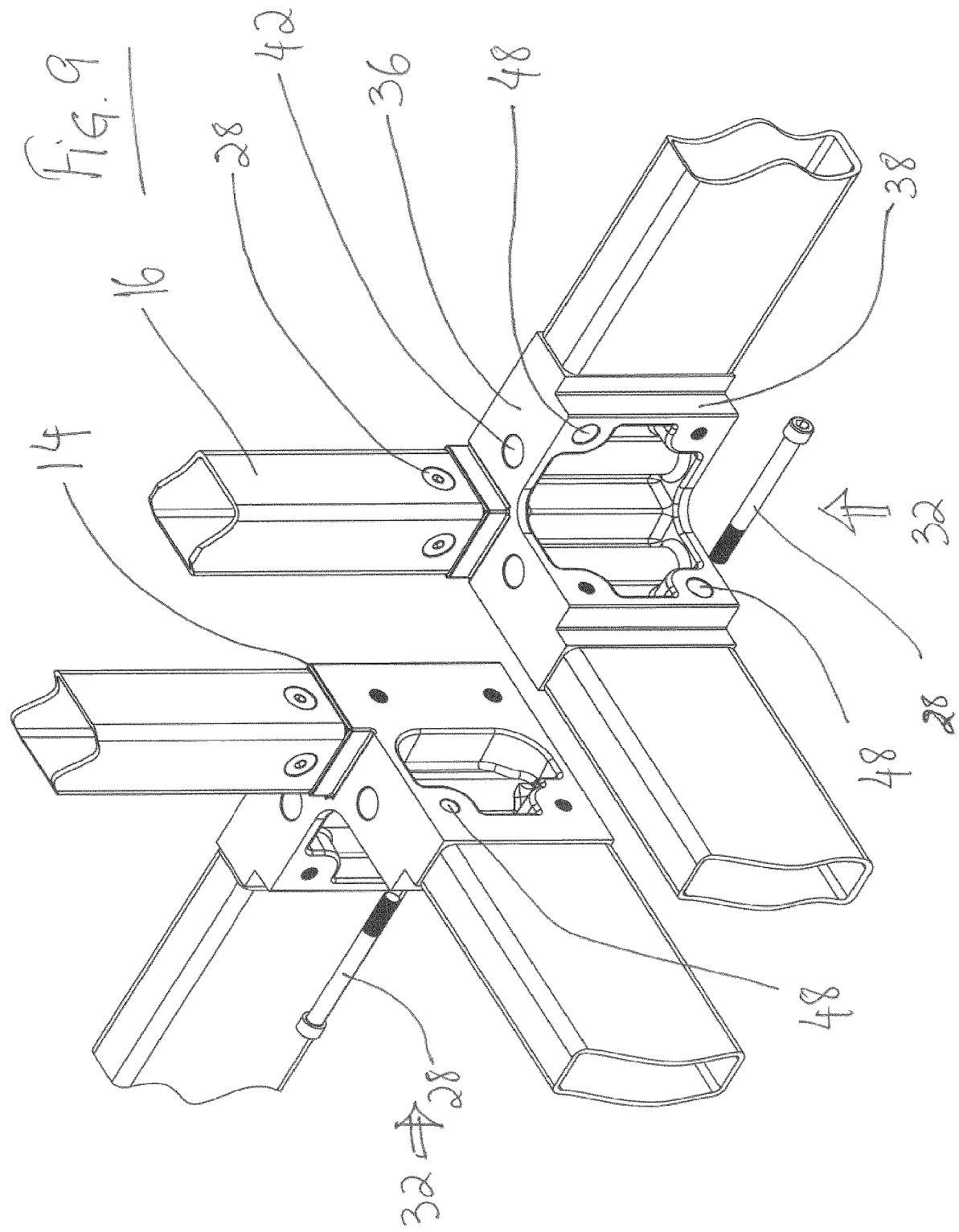
FIG. 9 is a perspective view of a 90° connector prior to coupling with an adjacent 90° connector.
Figure 10:
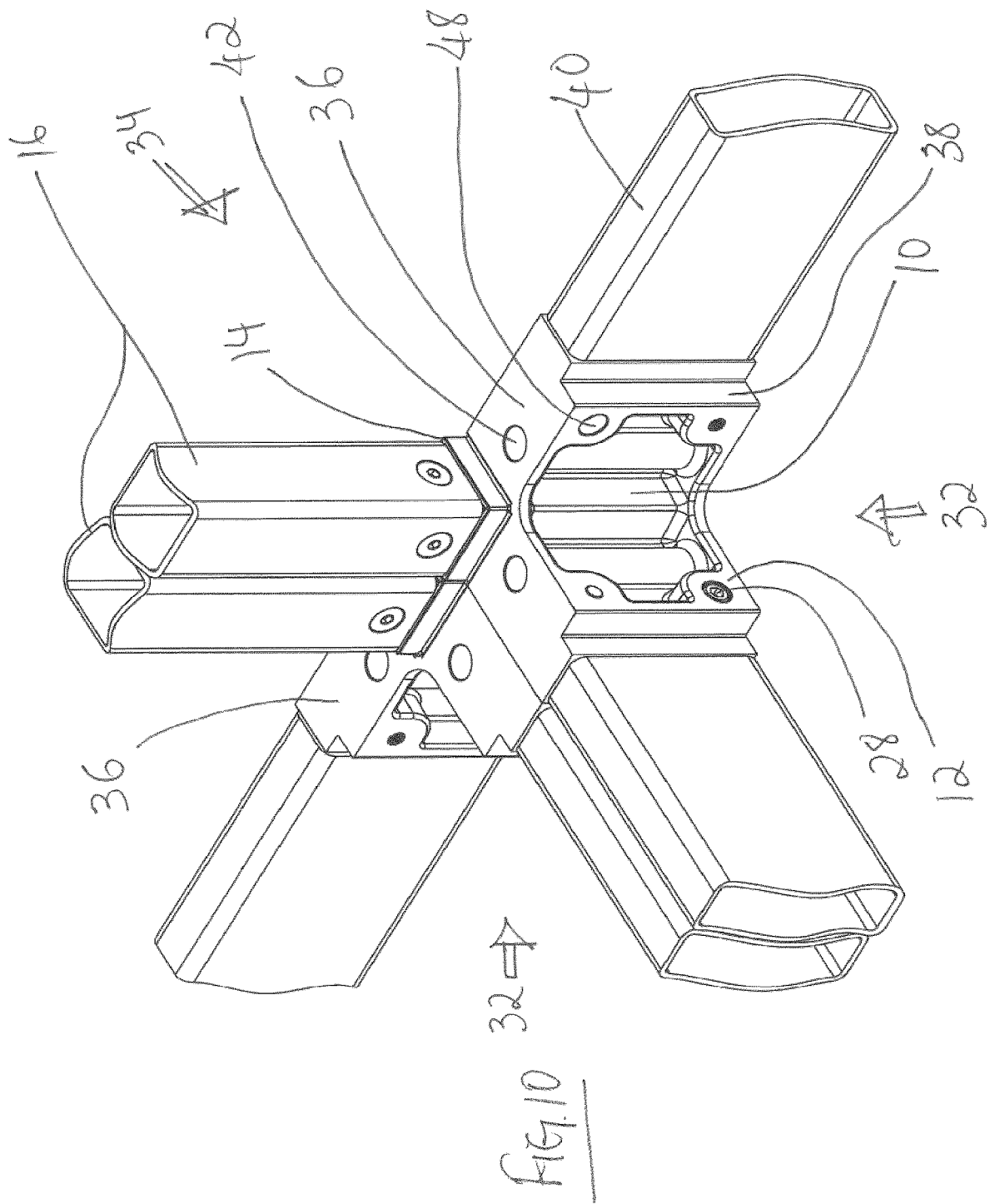
FIG. 10 is a perspective view of a 90° connector after coupling with an adjacent 90° connector.

FIGS. 9 (exploded) and 10 (assembled) show adjacent lower connectors 8 prior to (FIG. 9) and after coupling (FIG. 10). The lower connector 8 have holes 48 drilled transversely through lower connector arms 12, forming a channel and allowing fluid communication from the inner face 32 to the outer face 34 of the lower connector 8. The number and position of the holes 48 is not particularly limited and can be varied depending upon the design and application requirements. In the embodiment shown, each lower connector arm 8 has a pair of holes 48, with a first hole 48 formed closer to the lower connector arm load bearing face 36 and the other hole 48 formed closer to the lower connector gusset end 30. In addition, in one embodiment as shown in the figures, the holes 48 are at a distal position from the lower connector body 10, or in other words, more closer to the lower connector arm beam contact face 38. The actual position of the holes 48 to receive cross-bolts 28 is not particularly limited and can be varied depending upon application and design requirements, so long as they are positioned on the arms 12 of the connectors, formed transversely and allow for cross-bolts 28 to be inserted to fasten adjacent connectors, as disclosed herein. However, by positioning the holes 48 closer to a connector arm beam contact face 38 improved fixity can be achieved when coupling an adjacent connector.

To couple adjacent lower connectors 8, cross-bolts 28 can be used to fasten a first lower connector 8 to an adjacent second lower connector 8. In one embodiment as shown in FIG. 9, a first bolt 28 is inserted into a first hole 48 from the inner face 32 of a first lower connector 8, which then engages a corresponding first hole 48 from the outer face 34 of an adjacent second lower connector 8. In addition, a second bolt 28 is inserted into a second hole 48 from the inner face 32 of the second lower connector 8, which then engages a corresponding second hole 48 from the outer face 34 of the adjacent first lower connector 8. In the embodiment disclosed, the position of the holes 48 allow for alternating bolts 28 to be inserted to couple the adjacent lower connectors (see FIG. 9).

Figure 11:
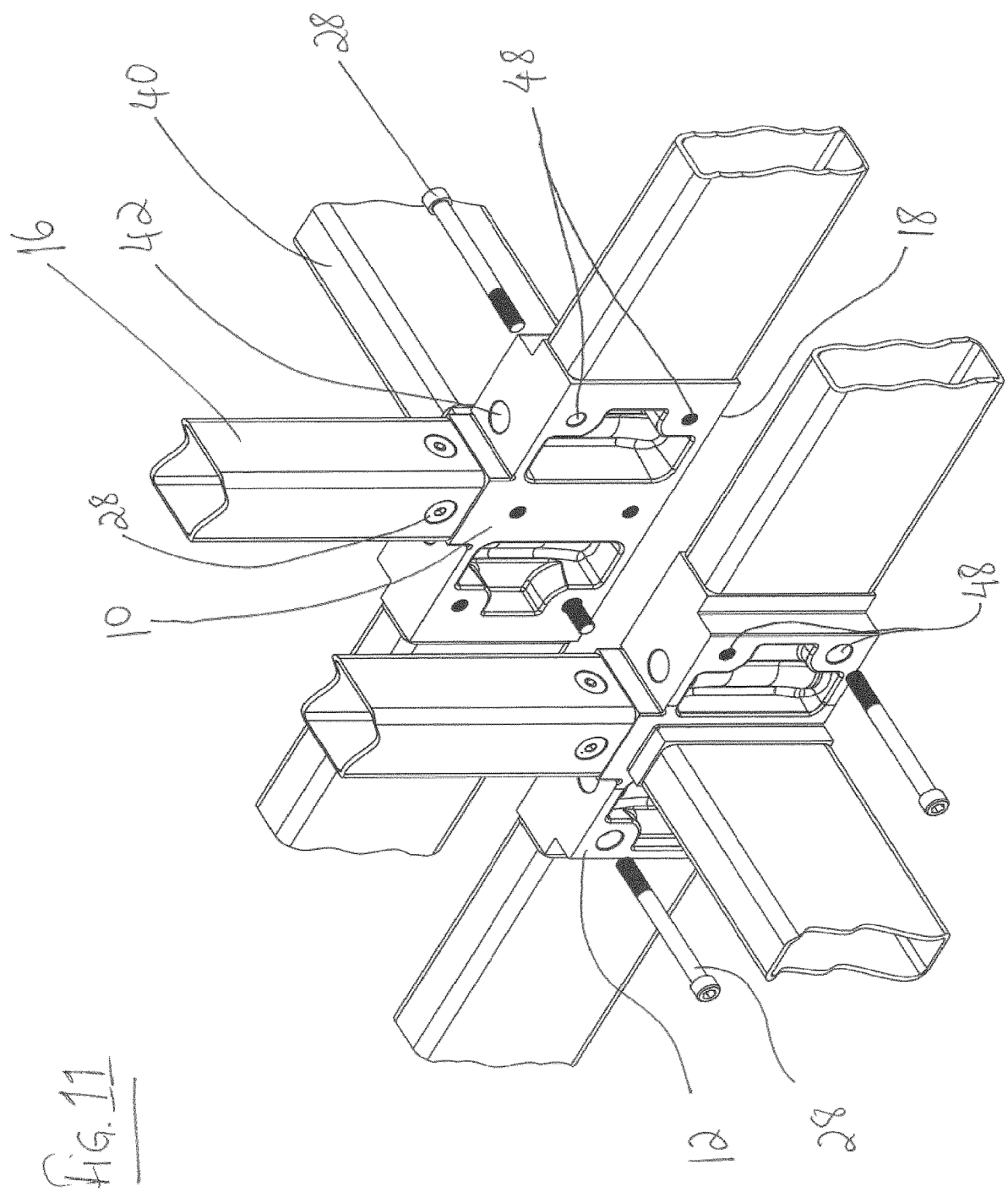
FIG. 11 is a perspective view of a 180° connector prior to coupling with an adjacent 180° connector.
Figure 12:
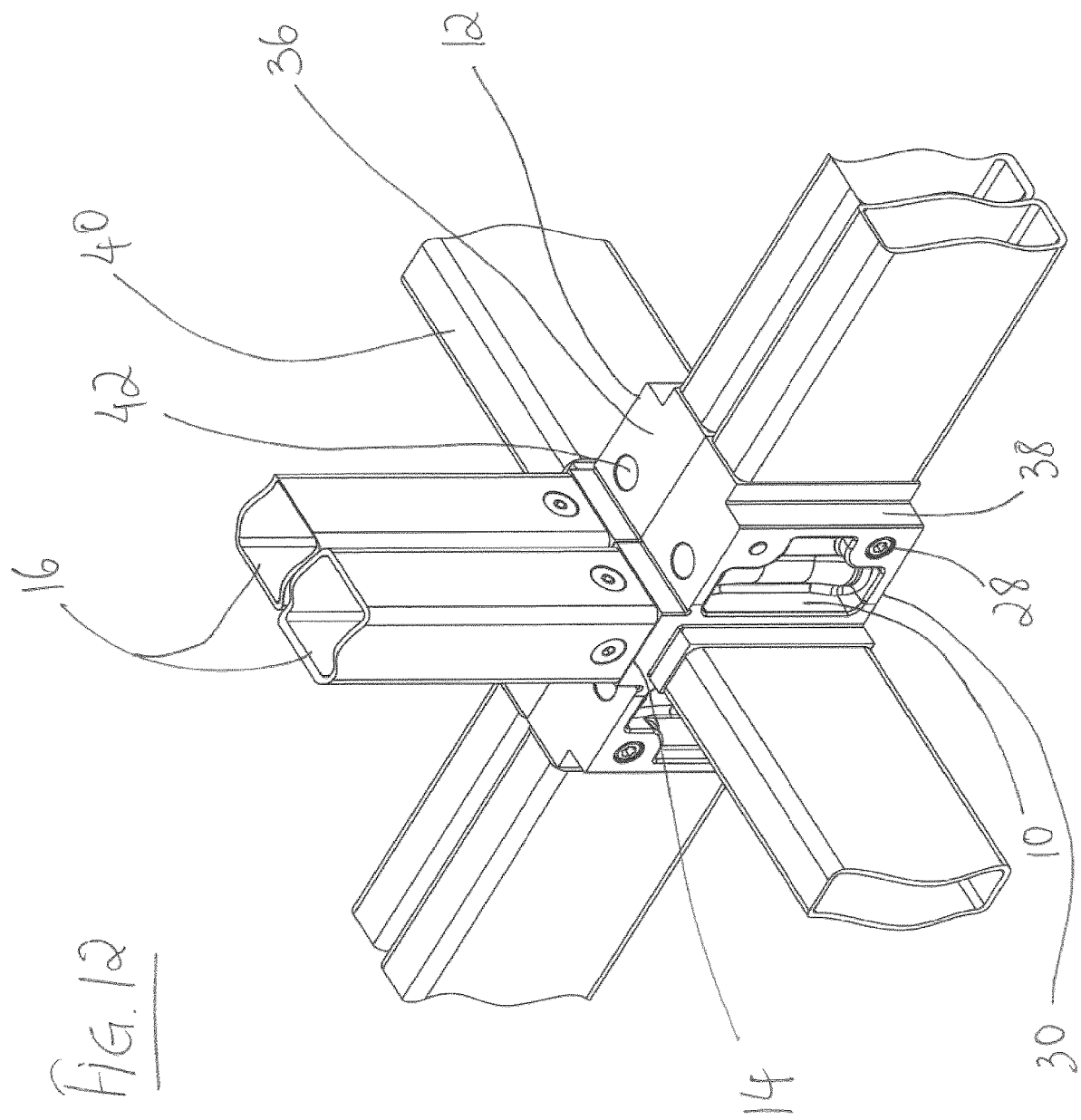
FIG. 12 is a perspective view of a 180° connector after coupling with an adjacent 180° connector.
Figure 13:
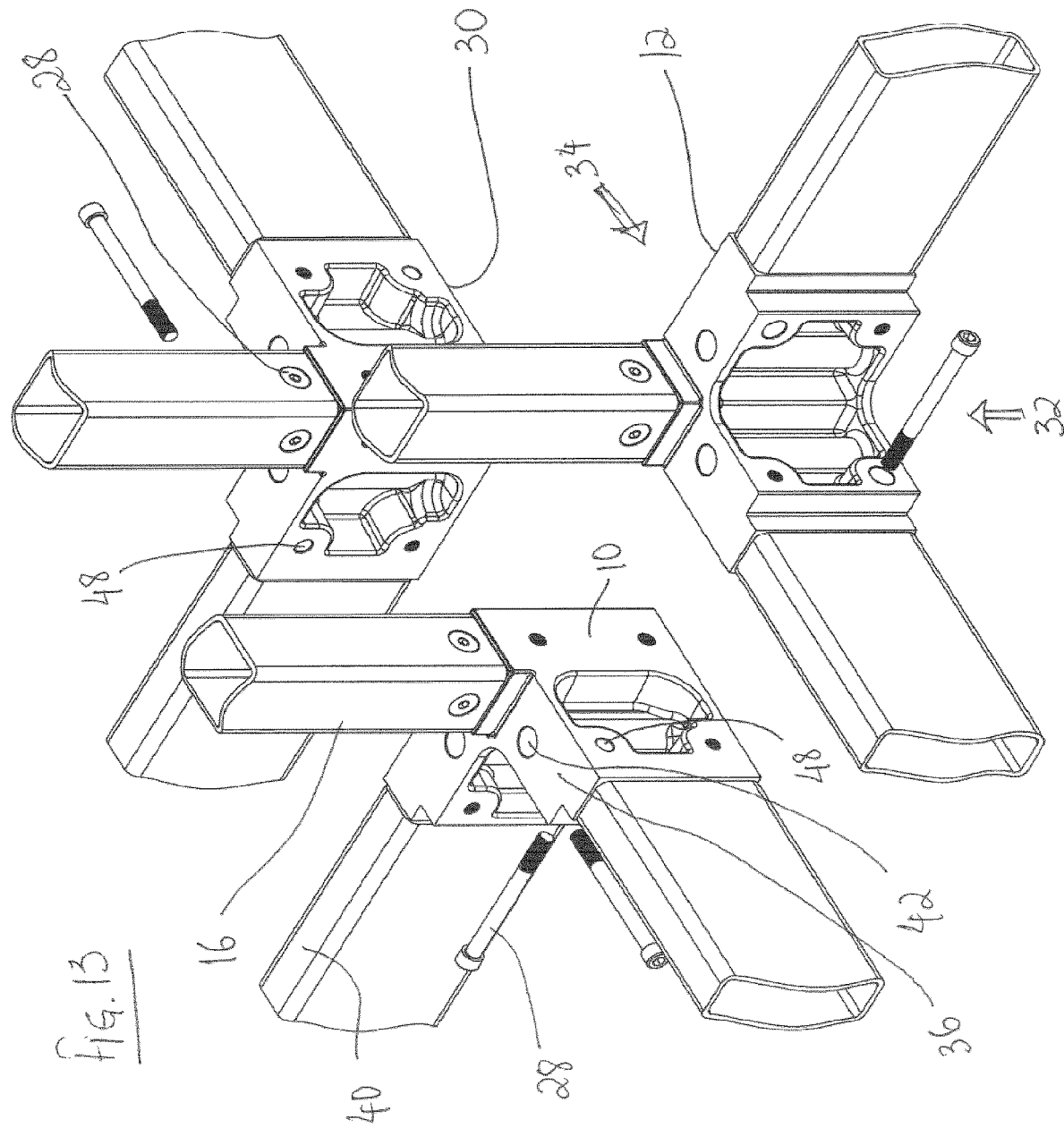
FIG. 13 is a perspective view of three 90° connectors prior to coupling.
Figure 14:
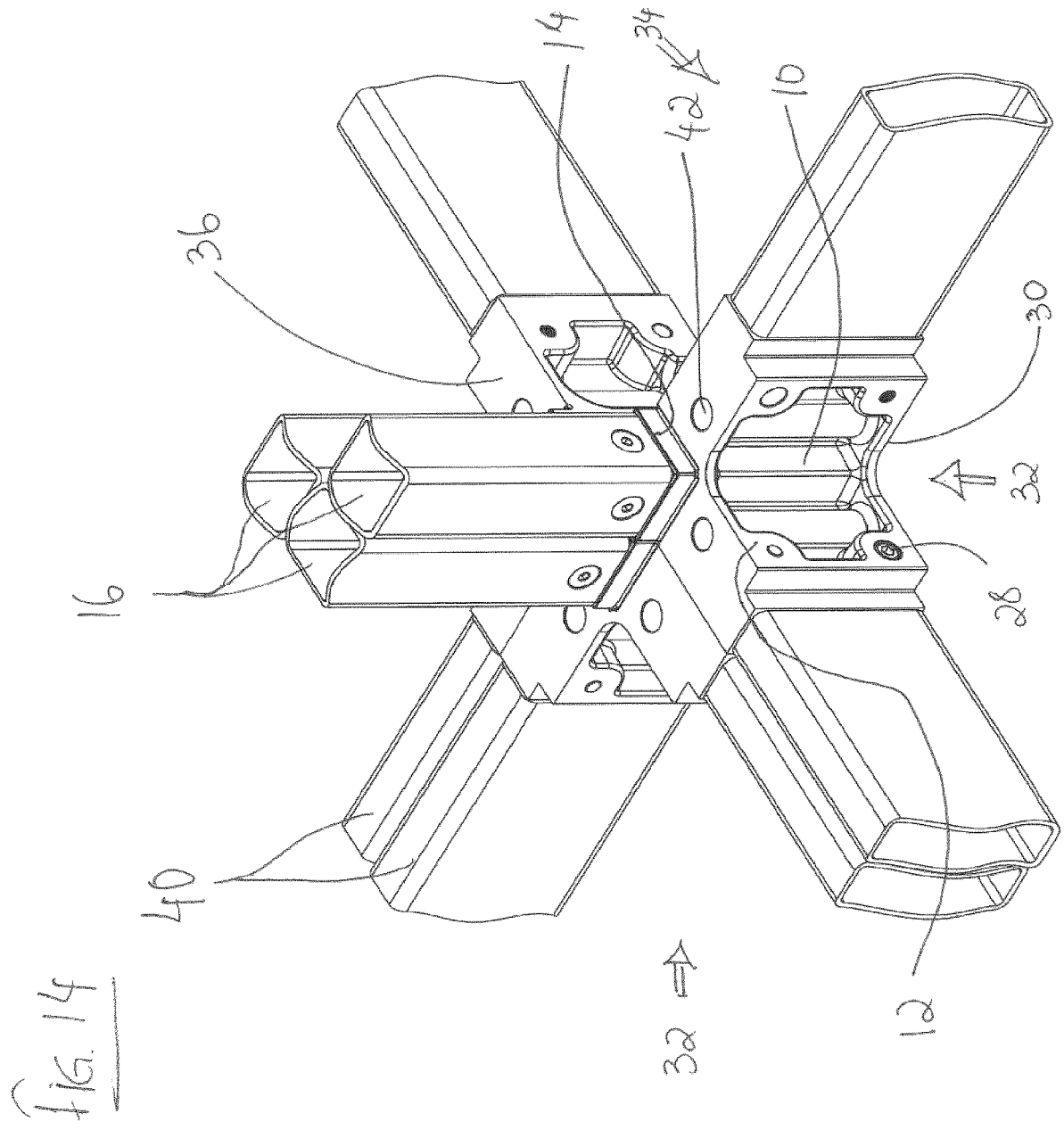
FIG. 14 is a perspective view of three 90° connectors after coupling.
Figure 15:
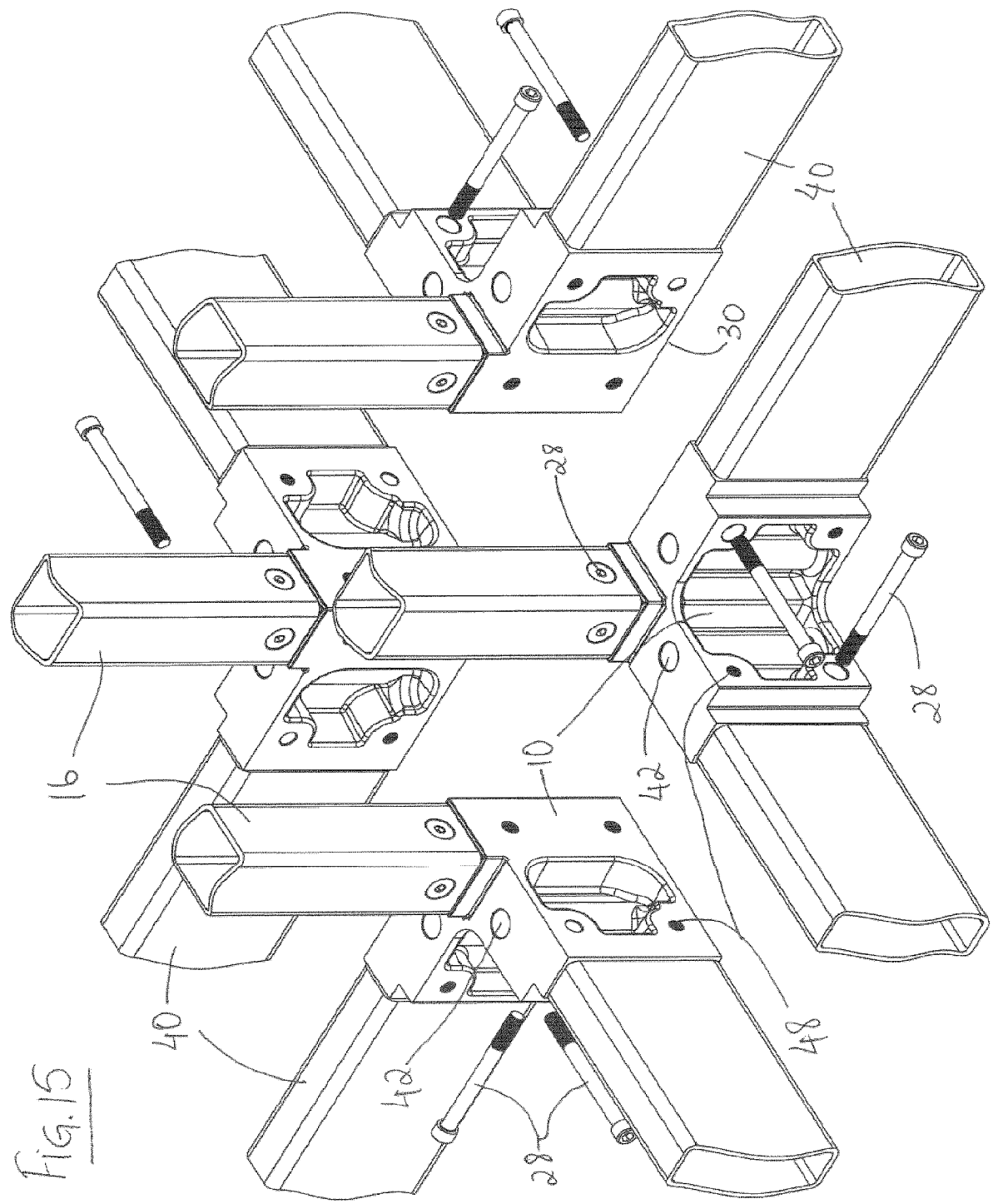
FIG. 15 is a perspective view of four 90° connectors prior to coupling.
Figure 16:
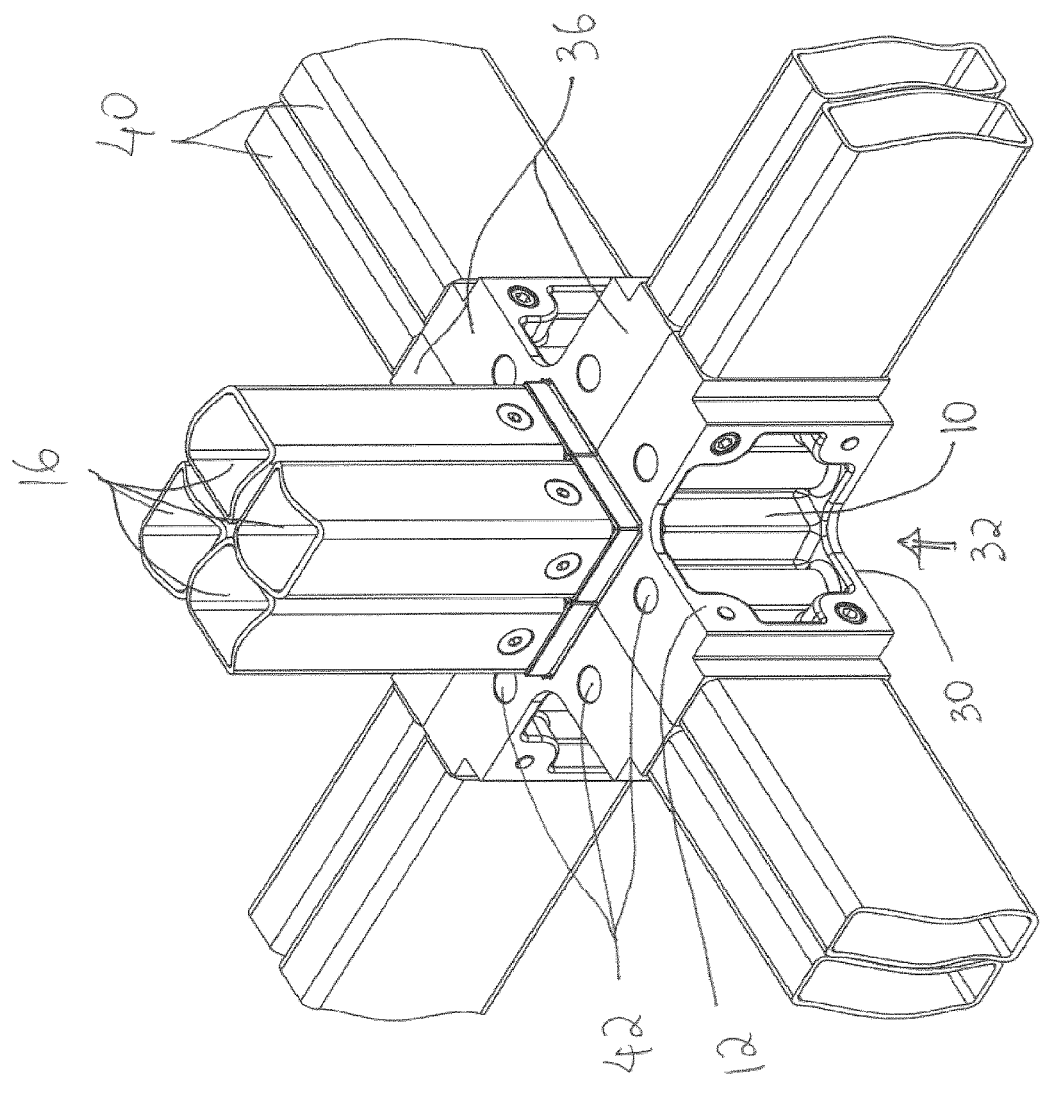
FIG. 16 is a perspective view of four 90° connectors after coupling.

FIGS. 9 and 10 show coupling of adjacent 90° lower connectors, while FIGS. 11 (exploded) and 12 (assembled) show coupling of adjacent 180° lower connectors, using cross-bolts 28, as described above. FIGS. 13 (exploded) and 14 (assembled) show coupling of three 90° lower connectors 8 using cross-bolts 28, while FIGS. 15 (exploded) and 16 (assembled) shown four 90° lower connectors 8 coupled using the cross-bolts 28, as described above.

Similar method can be used for coupling of the upper connectors 102, as described above with respect to the lower connectors 8; which are also provided with holes that are formed in a transverse plane of the arms 104 extending from the upper connector 102.

Figure 17:
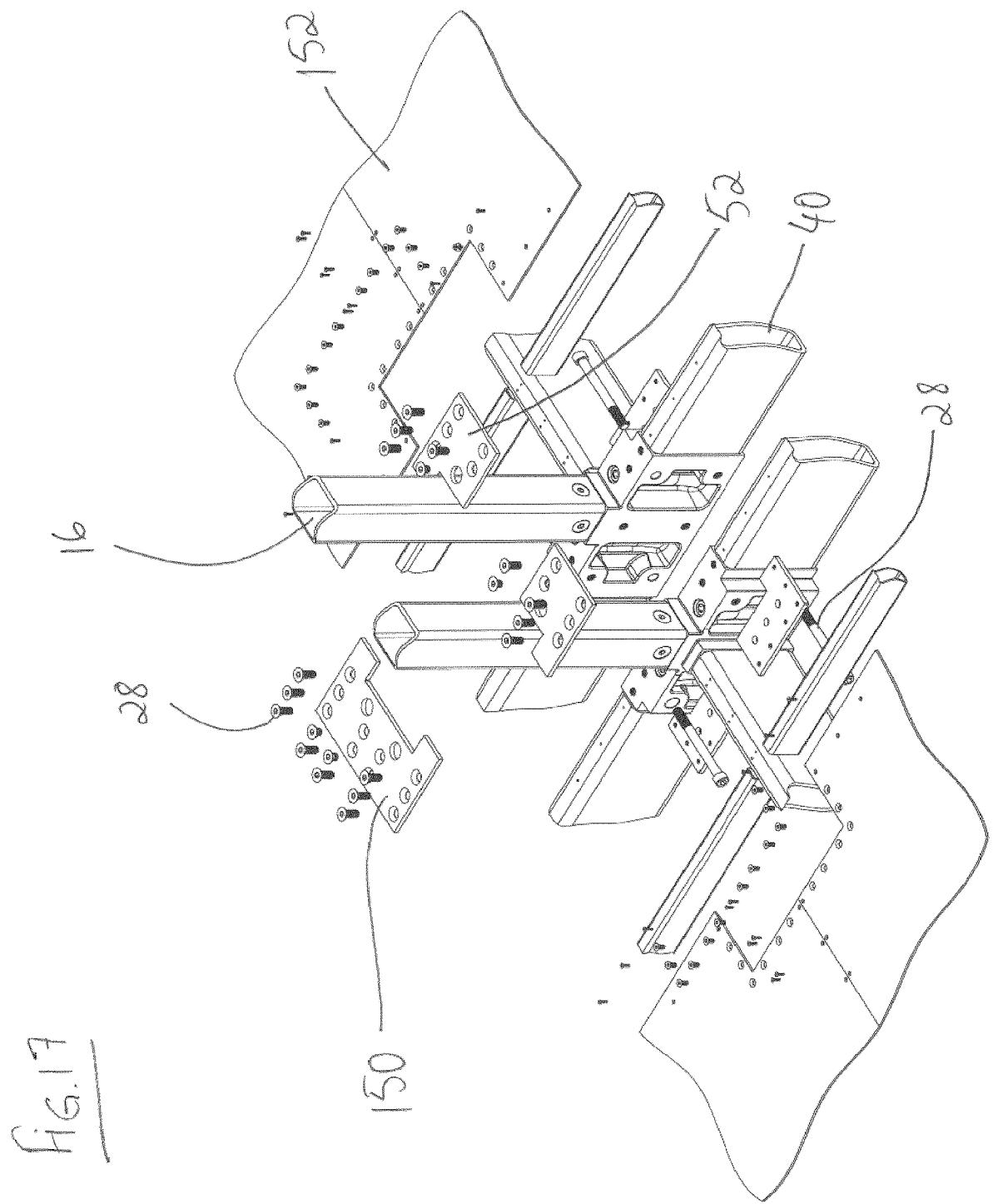
FIG. 17 shows an exploded partial perspective view of two adjacent modules before coupling of adjacent lower connectors.

FIGS. 17 (exploded) and 18 (assembled) show an alternate method of coupling adjacent modules when coupling a modular building 2 to a modular unit 4. In the embodiment shown in FIG. 17, a 180° lower connector is disclosed; however, as should be understood by a person of skill in the art, similar to coupling the lower connector 8, upper connectors 102 can also be coupled in a similar way.

Figure 18:
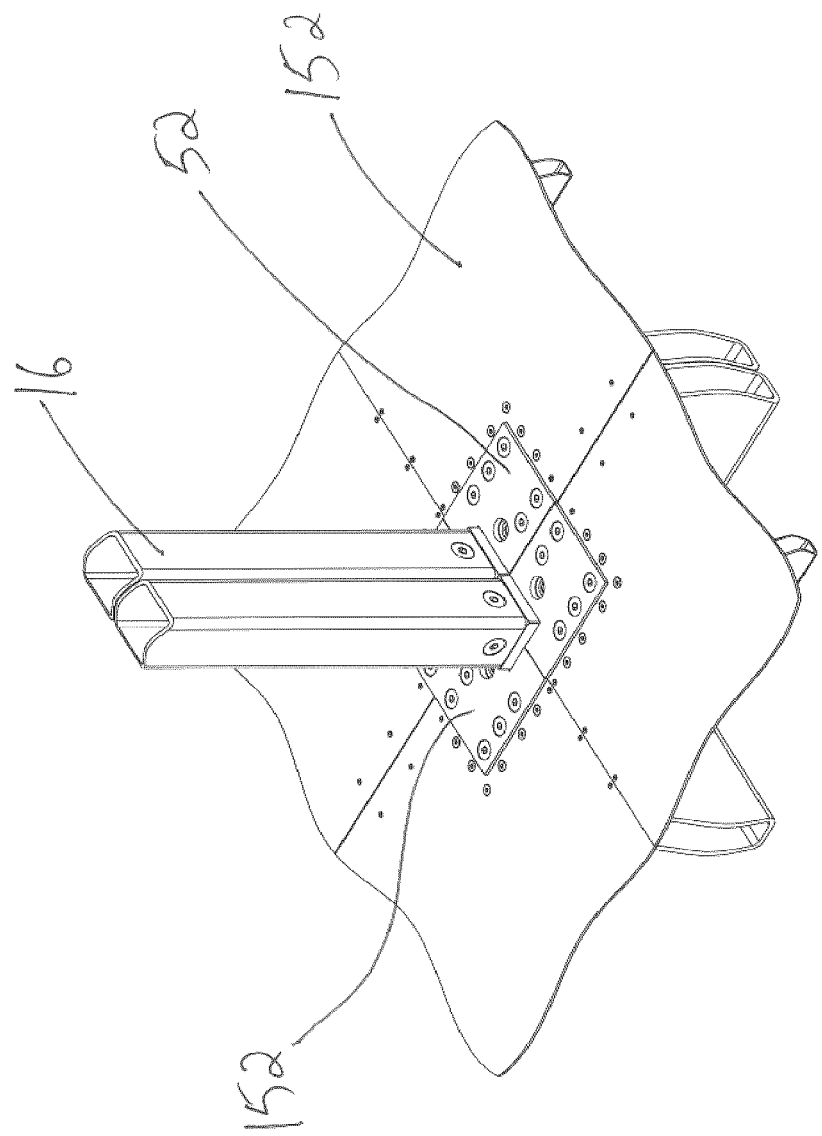
FIG. 18 shows a partial perspective view of two adjacent modules after coupling of adjacent lower connectors.

Features and methods described above with respect to the connectors and methods of coupling adjacent connectors can also be used when coupling adjacent connectors as disclosed in FIGS. 17 and 18. In the embodiment shown in FIGS. 17 and 18, a second gusset plate 52 is coupled to the lower connector arm load bearing face 36 using fastening means 28 that can be inserted into openings in the second gusset plate 52, which then engage in one or more holes on the lower connector arm load bearing face 36. The second gusset plate 52 upon coupling to the lower connector arm load bearing face 36 lies in the same plane as the a sub-floor 152. The second gusset plate used can be coupled to only a single arm 12 of the lower connector 8. Alternatively, as shown in FIG. 17 closer to the top of the figure page, when coupling adjacent lower connectors 8 to expand the footprint of a modular building, the second gusset plate 150 used is sized for coupling to two adjacent lower connector arms 12. Similar to other gusset plates 52, the gusset plate 150 used to couple to two adjacent lower connector arms 12 have holes that can receive fastening means 28 that engage the second gusset plate 150, as well as the two adjacent arms 12 on the two adjacent lower connectors 8. This can help with affixing and ensuring that a smooth floor of the expanded modular building 6.

FIGS. 19 and 20 show instances where diagonal bracing 154 is used in a module. Similar to the embodiment shown in FIGS. 17 and 18, a second gusset plate 150 is used to couple to the lower connector arm load bearing face 36. In the embodiment shown in FIGS. 19 and 20, the second gusset plate 150 is provided with projections 156 that have holes 156 for receiving fastening means 28 for affixing the diagonal brace 154 to the projections 156. When coupling adjacent lower connectors 8, the fastening means 28 can be removed from the projection 156, and the diagonal brace 154 can be pivoted (FIG. 20) about the opposing fixed end of the diagonal brace 154 to provide sufficient space to remove the second gusset plate 52 that only couples to a single arm 12 on a lower connector 8, and replace with a second gusset plate 150 that couples to two adjacent arms 12 on adjacent lower connectors 8. Once the second gusset plate 150 that couples to two adjacent arms 12 is in place, the diagonal brace 154 can be pivoted back into position to affix to the second gusset plate 150 installed.

In addition, the second gusset plate 150 can have additional projections 156 with holes that allow for coupling to a second diagonal brace (FIG. 19) and ensuring that the diagonal braces are aligned and affixed properly to ensure fixity.

The terms "upper" and "lower" as used herein, and particularly with respect to the connectors, are relative and can be interchanged. However, for the purpose of describing the connector assembly 100, upper connector 102 refers to connector that would typically be positioned at an upper corner or upper end of a modular frame that can be lifted and positioned on a second (or lower) modular frame. While lower connectors 8 refer to connectors positioned on the lower corner or lower end of a modular frame, and that would be closer to ground or floor (than the upper connector).

In the embodiments shown, the upper corner connector 102 and lower corner connector 8 can be made from hollow castings of steel. The connectors can have mechanical properties such as tensile strength and ductility equal to or greater than mild steel and metallurgical properties such that the connector can be welded to mild steel with standard practices such as structural metal inert gas (MIG) welding.

In a further embodiment, the upper and lower connectors (102, 8) each have a body, respectively, which in one particular embodiment can be hollow. The upper connector body 108 and the lower connector body 10 can have a variety of shapes depending upon the design and application requirements. However, in the figures, the upper and lower connectors (102, 8) have a shape having a square cross-section.

In one embodiment, the connector bodies (108, 10) are 4" square to accept a 4"×4" Hollow Structural Section (HSS). In another embodiment, the connector bodies (108, 10) are 6" square to accept a 6"×6" HSS. Connectors 102 and 8 have adequate thickness for the intended function and details such as draft angles and uniformity of sections which facilitate casting. In a particular embodiment, the casting are drilled and surfaces milled to a high accuracy as measured between centres of the apertures and the other apertures, as well as the faces of the block. Additionally, perpendicularity and parallelism are similarly maintained to high tolerances, or other tolerances as may be convenient. In another embodiment, the connector is made by assembling one or more of rolled sections, flat or brake-formed plate by welding or mechanical means. In a further embodiment, the part is made by casting non-ferrous, plastic, cementitious or any other suitable material. In another embodiment, the portions of the blocks to which the columns and arms will be connected can have features to locate the HSS and facilitate welding.

Certain adaptations and modifications of the described embodiments can be made. Therefore, the above discussed embodiments are considered to be illustrative and not restrictive.

Parts list

| No. | Description |
|---|---|
| 2 | Existing modular building |
| 4 | Pre-fabricated modular building unit |
| 6 | Expanded modular building |
| 8 | Corner connector |
| 10 | lower connector body |
| 12 | lower connector arms |

-continued

Parts list

| No. | Description |
|---|---|
| 14 | lower connector body column receiving end |
| 16 | Column |
| 18 | lower connector body gusset contact face |
| 20 | first gusset plate |
| 22 | lower connector body weld receiving bevel |
| 24 | lower connect body weld backer |
| 26 | column holes |
| 27 | Holes in weld backer |
| 28 | fastening means |
| 30 | lower connector body gusset end |
| 32 | lower connector inner face |
| 34 | lower connector outer face |
| 36 | lower connector arm load bearing face |
| 38 | lower connector arm beam contact face |
| 40 | Beam |
| 42 | lower connector arm holes on load bearing face |
| 44 | boss on lower connector arm |
| 46 | lower connector weld receiving bevel |
| 48 | holes extending from inner to outer face of lower connector arm |
| 50 | holes extending from inner to outer face of upper connector arm |
| 52 | gusset plate |
| 54 | Pin |
| 56 | holes in gusset plate to receive pin |
| 100 | connector assembly |
| 102 | upper connector |
| 104 | upper connector arm |
| 106 | upper connector gusset contact face |
| 108 | upper connector body |
| 150 | Second gusset plate |
| 152 | Subfloor |
| 154 | Diagonal bracing |
| 156 | Projections |
| 158 | Holes in projections |

What is claimed is:

1. A connector assembly, comprising an upper connector coupled to a lower connector and a gusset plate sandwiched between the upper and lower connectors, the lower connector comprising:

a lower connector body having a lower connector body column receiving end and a lower connector body gusset contact end, the column receiving end being adapted for receiving a first end of a first module frame and the gusset contact end being adapted for coupling to the gusset plate;

at least a pair of lower connector arms, each lower connector arm coupled to and extending from the lower connector body and having lower connector arm inner face, a lower connector arm outer face, a lower connector arm gusset contact face, a lower connector arm load bearing face and a lower connector arm beam contact face, the beam contact face being positioned distal from the lower connector body, each lower connector arm having at least one fixing aperture on the load bearing face for receiving a fastening means to couple the lower connector to the upper connector, and each lower connector arm having a hole formed that extends from the lower connector arm inner face to the lower connector arm outer face and configured to receive a fastening means to couple the lower connector to a second lower connector; and a lower connector arm boss coupled to and extending from the beam contact face of each arm, the boss having a lower connector arm weld receiving bevel extending from the distal end of the arm;

the upper connector comprising:
- an upper connector body having an upper connector body column receiving end and an upper connector body gusset contact end, the column receiving end being adapted for receiving a first end of a second module frame and the gusset contact end being adapted for coupling to the gusset plate;
- at least a pair of upper connector arms, each upper connector arm coupled to and extending from the upper connector body and having an upper connector arm inner face, an upper connector arm outer face, an upper connector arm gusset contact face, an upper connector arm load bearing face and an upper connector arm beam contact face, the beam contact face being positioned distal from the upper connector body; each upper connector arm having at least one upper connector arm fixing aperture for receiving a fastening means to couple the lower connector to the upper connector and at least one upper connector arm gusset coupling aperture for receiving a second fastening means to couple the upper connector to the gusset plate, and each upper connector arm having a hole formed that extends from the upper connector arm inner face to the upper connector arm outer face and configured to receive a fastening means to couple the upper connector to a second upper connector; and
- an upper connector arm boss coupled to and extending from the upper connector arm beam contact face of each upper connector arm, the boss having an upper connector arm weld receiving bevel extending from the distal end of the arm;

the gusset plate comprising:
- a gusset plate first face, a gusset plate second face and gusset plate through holes for receiving the coupling and fastening means to couple the upper connector and the lower connector.

2. The connector assembly according to claim 1, further comprising the second lower connector coupled to the lower connector and the second upper connector, with the gusset plate positioned between the second lower connector and the second upper connector;

the second lower connector comprising:
- a second lower connector body having a second lower connector body column receiving end and a second lower connector body gusset contact end, the second lower connector body column receiving end being adapted for receiving a first end of a third module frame and the second lower connector body gusset contact end being adapted for coupling to the gusset plate;
- at least a pair of second lower connector arms, each second lower connector arm coupled to and extending from the second lower connector body and having a second lower connector arm inner face, a second lower connector arm outer face, a second lower connector arm gusset contact face, a second lower connector arm load bearing face and a second lower connector arm beam contact face, the second lower connector arm beam contact face being positioned distal from the second lower connector body, each second lower connector arm having at least one fixing aperture on the second lower connector arm load bearing face for receiving a fastening means to couple the second lower connector to the second upper connector, and each second lower connector arm having a hole formed that extends from the second lower connector arm inner face to the second lower connector arm outer face; and
- a second lower connector arm boss coupled to and extending from the second lower connector arm beam contact face of each arm, the second lower connector arm boss having a second lower connector arm weld receiving bevel extending from the distal end of the arm; and the second upper connector comprising:
- a second upper connector body having a second upper connector body column receiving end and a second upper connector body gusset contact end, the second upper connector column receiving end being adapted for receiving a first end of a fourth module frame and the second upper connector gusset contact end being adapted for coupling to the gusset plate;
- at least a pair of second upper connector arms, each second upper connector arm coupled to and extending from the second upper connector body and having a second upper connector arm inner face, a second upper connector arm outer face, a second upper connector arm gusset contact face, a second upper connector arm load bearing face and a second upper connector arm beam contact face, the second upper connector arm beam contact face being positioned distal from the second upper connector body; each second upper connector arm having at least one second upper connector arm fixing aperture for receiving a fastening means to couple the second lower connector to the second upper connector and at least one second upper connector arm gusset coupling aperture for receiving a second fastening means to couple the second upper connector to the gusset plate, and each second upper connector arm having a hole formed that extends from the second upper connector arm inner face to the second upper connector arm outer face; and
- a second upper connector arm boss coupled to and extending from the second upper connector arm beam contact face of each upper connector arm, the second upper connector arm boss having a second upper connector arm weld receiving bevel extending from the distal end of the second upper connector arm;

wherein
the second lower connector arm outer face is proximate the lower connector arm outer face, the second upper connector arm outer face is proximate the upper connector arm outer face, and the second lower connector arm gusset contact face is proximate the second upper connector arm load bearing face.

3. The connector assembly of claim 2, wherein a fastening means engages the hole in the lower connector arm inner face and the second lower connector arm inner face and couples the lower connector arm to the second lower connector arm.

4. The connector assembly of claim 2, wherein a second fastening means engages the hole in the upper connector arm inner face and the second upper connector arm inner face and couples the upper connector arm to the second upper connector arm.

5. The connector assembly according to claim 2, further comprising:
- a second gusset plate positioned on the lower connector arm load bearing face and the second lower connector arm load bearing face,
- the second gusset plate has a plurality of apertures, the lower connector arm load bearing face having a hole aligned with one of the plurality of apertures on the second gusset plate, and the second lower connector arm load bearing face having a hole aligned with one of the other plurality of apertures; and a fastening means engaging the aperture on the second gusset plate, where the aperture is aligned with the hole on the lower connector load bearing face for affixing the second gusset plate to the lower connector, and a second fastening means engaging another aperture of the plurality of apertures on the second gusset plate, where the other aperture is aligned with the hole on the second lower connector arm load bearing face for affixing the second gusset plate to the second lower connector.

6. The connector assembly according to claim 5, further comprising:
a projection coupled to and extending from the second gusset plate; the projection extending in a direction away from the lower connector arm load bearing face.

7. The connector assembly according to claim 6, further comprising a brace coupled to the projection.

8. A method of forming a connector assembly having a lower connector, an upper connector, a gusset plate, a second lower connector and a second upper connector, wherein the lower connector, the upper connector, the gusset plate, the second lower connector and the second upper connector are as defined in claim 2, the method comprising the steps of:
positioning the lower connector, the upper connector, the gusset plate, the second lower connector and the second upper connector;
coupling the lower connector to the upper connector;
coupling the second lower connector to the second upper connector;
coupling the lower connector to the second lower connector; and
coupling the upper connector to the second upper connector.

9. A method of coupling adjacent modular buildings, wherein the modular buildings together have a lower connector, an upper connector, a gusset plate, a second lower connector and a second upper connector, wherein the lower connector, the upper connector, the gusset plate, the second lower connector and the second upper connector are as defined in claim 2, the method comprising the steps of:
positioning a first modular unit of a first modular building adjacent to a modular unit of the other modular building;
coupling the lower connector of the first modular unit of the first modular building to the second lower connector of the modular unit of the other building; and
coupling the upper connector of the first modular unit of the first modular building to the second upper connector of the modular unit of the other building.

10. A modular building comprising a lower connector, an upper connector, a gusset plate, a second lower connector and a second upper connector, wherein the lower connector, the upper connector, the gusset plate, the second lower connector and the second upper connector are as defined in claim 2.

11. A lower connector comprising:
a lower connector body having a lower connector body column receiving end and a lower connector body gusset contact end, the column receiving end being adapted for receiving a first end of a first module frame and the gusset contact end being adapted for coupling to the gusset plate;
at least a pair of lower connector arms, each lower connector arm coupled to and extending from the lower connector body and having lower connector arm inner face, a lower connector arm outer face, a lower connector arm gusset contact face, a lower connector arm load bearing face and a lower connector arm beam contact face, the beam contact face being positioned distal from the lower connector body, each lower connector arm having at least one fixing aperture on the load bearing face for receiving a fastening means to couple the lower connector to the upper connector, and each lower connector arm having a hole formed that extends from the lower connector arm inner face to the lower connector arm outer face and configured to receive a fastening means to couple the lower connector to a second lower connector; and
a lower connector arm boss coupled to and extending from the beam contact face of each arm, the boss having a lower connector arm weld receiving bevel extending from the distal end of the arm.

12. An upper connector comprising:
an upper connector body having an upper connector body column receiving end and an upper connector body gusset contact end, the column receiving end being adapted for receiving a first end of a second module frame and the gusset contact end being adapted for coupling to the gusset plate;
at least a pair of upper connector arms, each upper connector arm coupled to and extending from the upper connector body and having an upper connector arm inner face, an upper connector arm outer face, an upper connector arm gusset contact face, an upper connector arm load bearing face and an upper connector arm beam contact face, the beam contact face being positioned distal from the upper connector body; each upper connector arm having at least one upper connector arm fixing aperture for receiving a fastening means to couple the lower connector to the upper connector and at least one upper connector arm gusset coupling aperture for receiving a second fastening means to couple the upper connector to the gusset plate, and each upper connector arm having a hole formed that extends from the upper connector arm inner face to the upper connector arm outer face and configured to receive a fastening means to couple the upper connector to a second upper connector; and
an upper connector arm boss coupled to and extending from the upper connector arm beam contact face of each upper connector arm, the boss having an upper connector arm weld receiving bevel extending from the distal end of the arm.

\* \* \* \* \*